(12) United States Patent  
Moser

(10) Patent No.: US 8,953,311 B2  
(45) Date of Patent: Feb. 10, 2015

(54) ELECTRONIC MEDIA DISTRIBUTION SYSTEM

(76) Inventor: George Moser, Redwood City, CA (US)

(*) Notice: Subject to any disclaimer, the term of this patent is extended or adjusted under 35 U.S.C. 154(b) by 289 days.

(21) Appl. No.: 13/456,234

(22) Filed: Apr. 26, 2012

(65) Prior Publication Data

US 2013/0208414 A1    Aug. 15, 2013

Related U.S. Application Data

(60) Provisional application No. 61/598,106, filed on Feb. 13, 2012.

(51) Int. Cl.
*G06F 1/16* (2006.01)
*G06F 1/18* (2006.01)

(52) U.S. Cl.
CPC ..................................... *G06F 1/182* (2013.01)
USPC .................................................... 361/679.32

(58) Field of Classification Search
CPC ....................................................... G06F 1/182
USPC .................................................... 361/679.32
See application file for complete search history.

(56) References Cited

U.S. PATENT DOCUMENTS

| | | | | |
|---|---|---|---|---|
| 5,109,354 A * | 4/1992 | Yamashita et al. | ............. | 708/110 |
| 5,467,102 A * | 11/1995 | Kuno et al. | ..................... | 345/1.3 |
| 5,534,888 A * | 7/1996 | Lebby et al. | .................. | 345/672 |
| 5,661,635 A * | 8/1997 | Huffman et al. | ......... | 361/679.32 |
| 5,663,748 A * | 9/1997 | Huffman et al. | ............. | 345/173 |
| 5,697,793 A * | 12/1997 | Huffman et al. | .............. | 434/317 |
| 5,761,485 A * | 6/1998 | Munyan | ........................ | 715/839 |
| 5,949,643 A * | 9/1999 | Batio | ........................ | 361/679.27 |
| 6,065,076 A * | 5/2000 | Sorenson | ......................... | 710/72 |
| 6,222,726 B1 * | 4/2001 | Cha | ........................... | 361/679.32 |
| 6,229,502 B1 * | 5/2001 | Schwab | ......................... | 345/1.1 |
| 6,257,902 B1 * | 7/2001 | Shieh | ............................ | 439/76.1 |
| 6,313,828 B1 * | 11/2001 | Chombo | ..................... | 345/169 |
| 7,019,961 B2 * | 3/2006 | Misawa | ...................... | 361/679.32 |
| 7,834,276 B2 * | 11/2010 | Chou et al. | ..................... | 174/262 |
| 2007/0154876 A1 * | 7/2007 | Harrison | ....................... | 434/365 |
| 2010/0164836 A1 * | 7/2010 | Liberatore | ...................... | 345/1.1 |
| 2013/0010421 A1 * | 1/2013 | Fahey et al. | ............. | 361/679.32 |

* cited by examiner

*Primary Examiner* — Lisa Lea Edmonds
(74) *Attorney, Agent, or Firm* — Brad Bertoglio

(57) ABSTRACT

A portable media storage device is provided. The device includes persistent digital storage programmed to contain digital media content. Two or more connectors of different types can be provided for engagement with a variety of electronic reader devices. The media storage devices can be sold at retail, alongside alternative traditional formats for consumption of the same media.

9 Claims, 33 Drawing Sheets

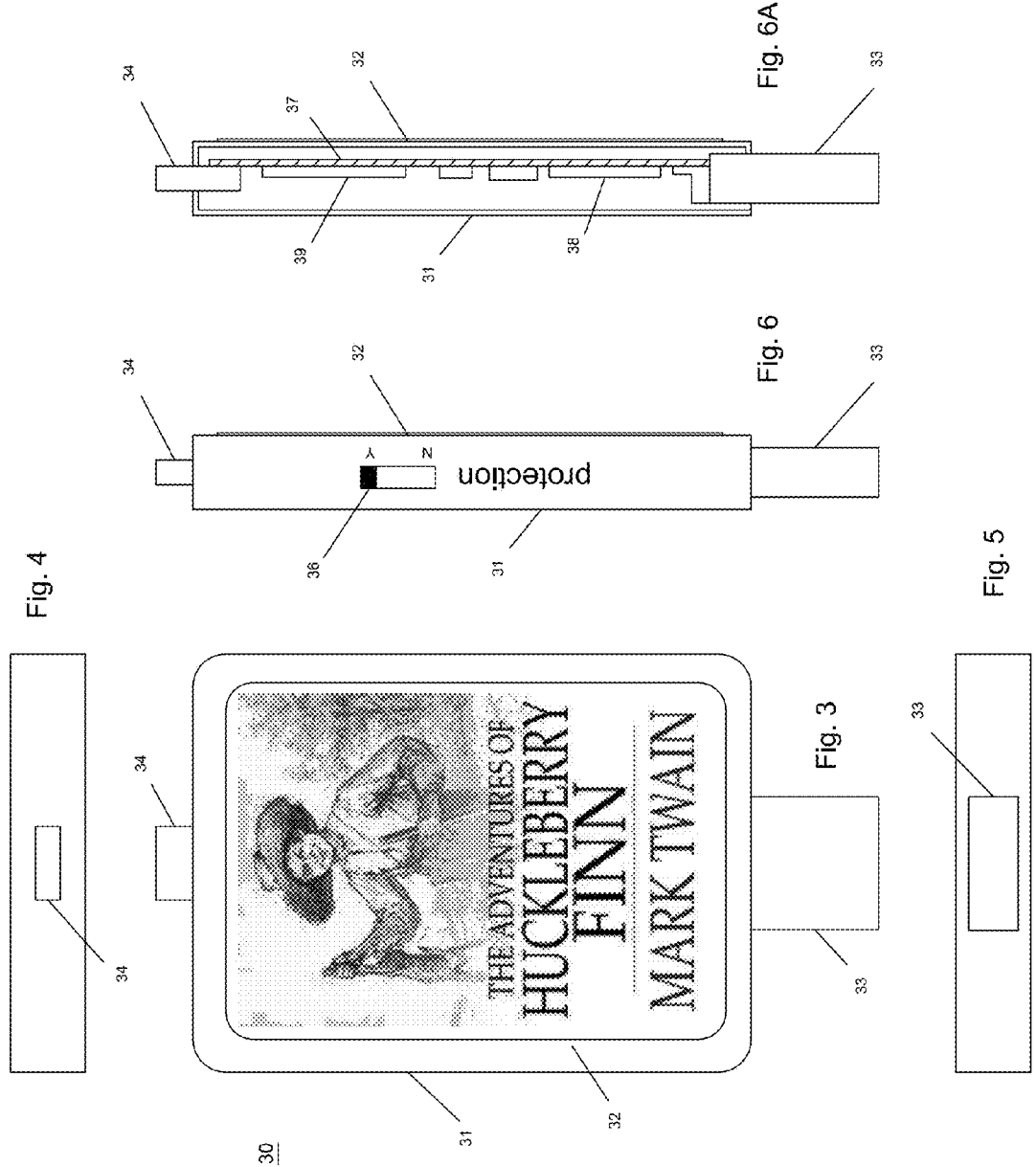

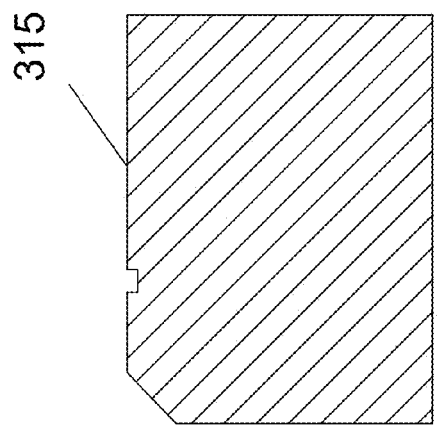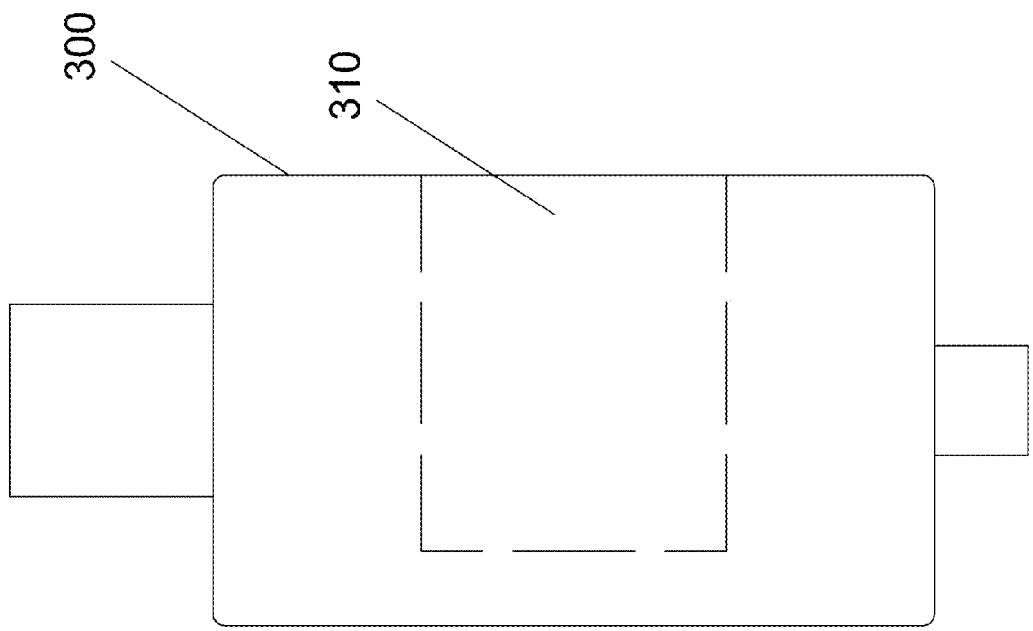

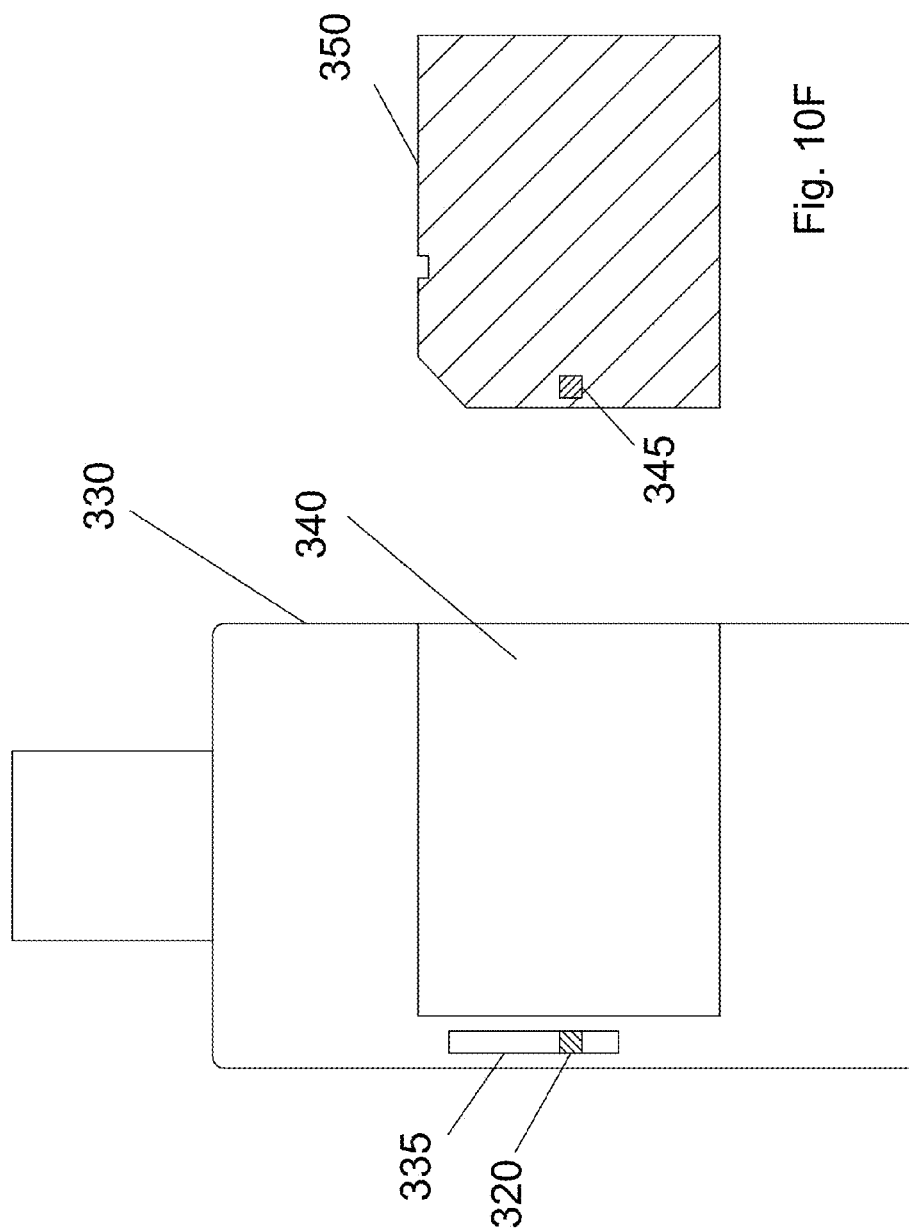

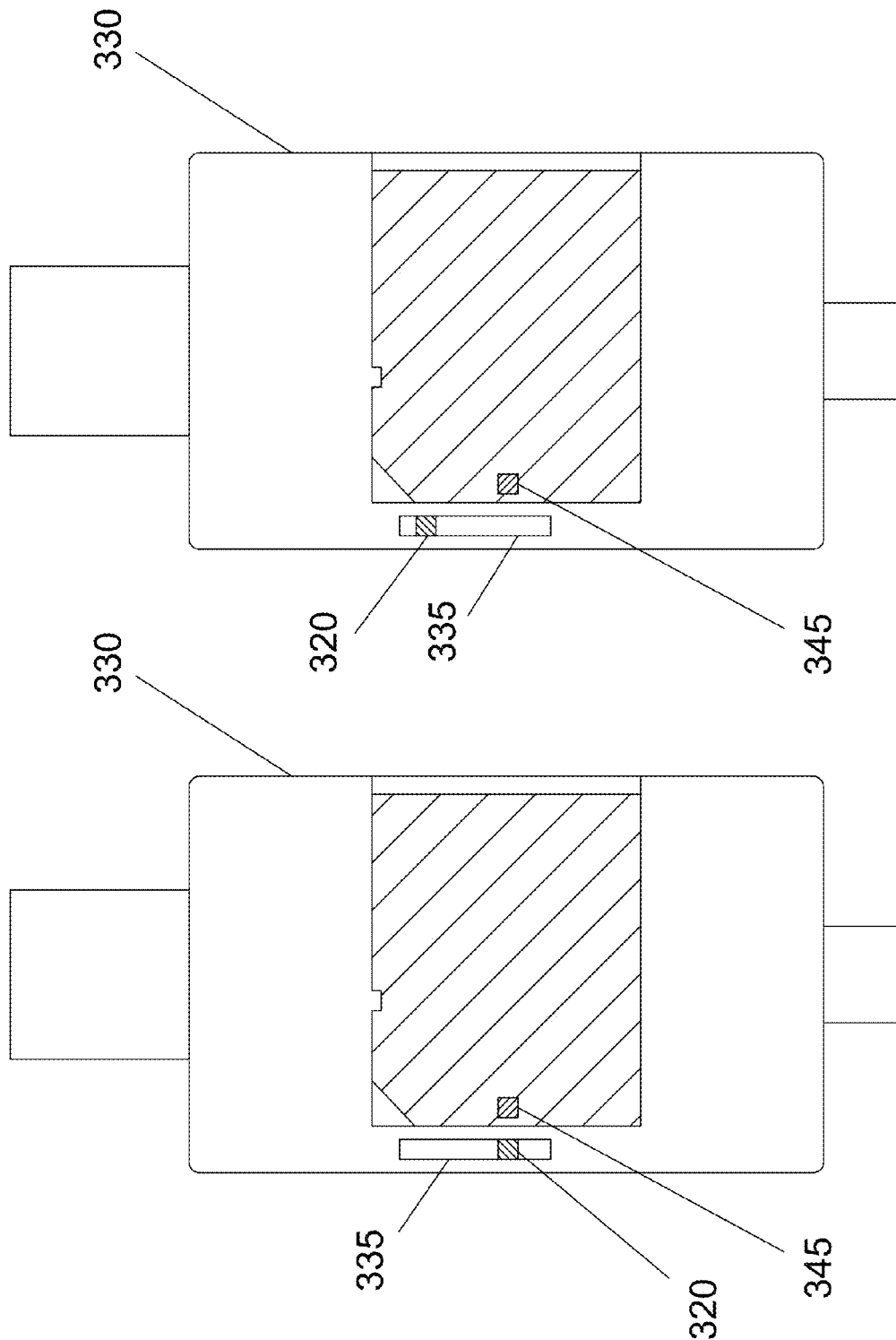

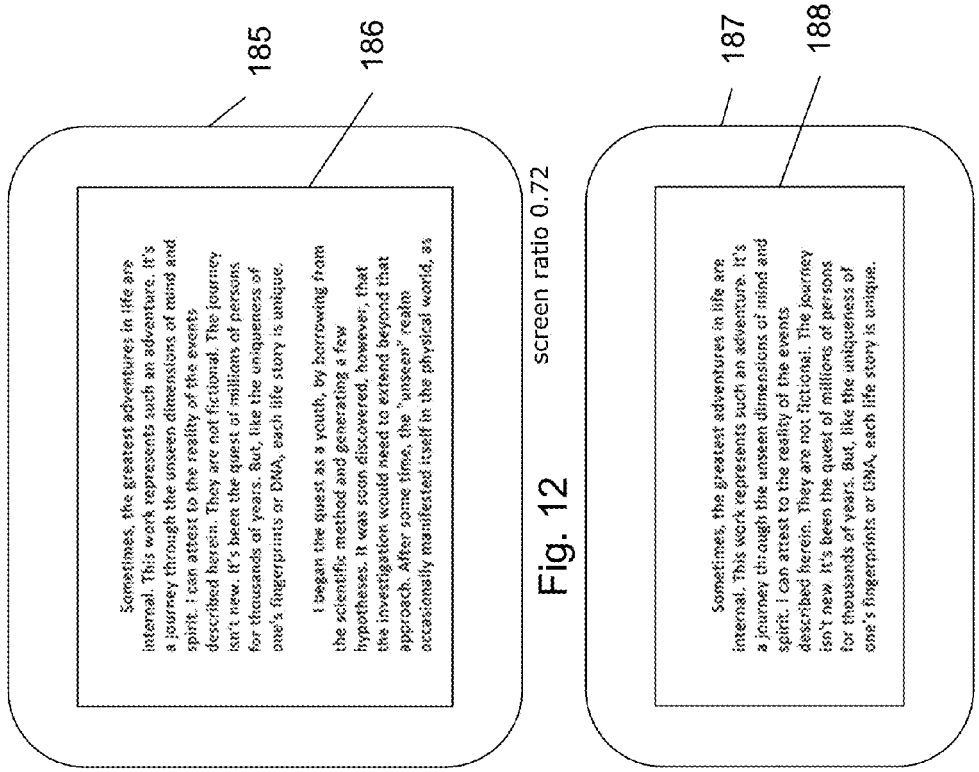
Fig. 11 screen ratio 1.44
Fig. 12 screen ratio 0.72
Fig. 13 screen ratio 0.47

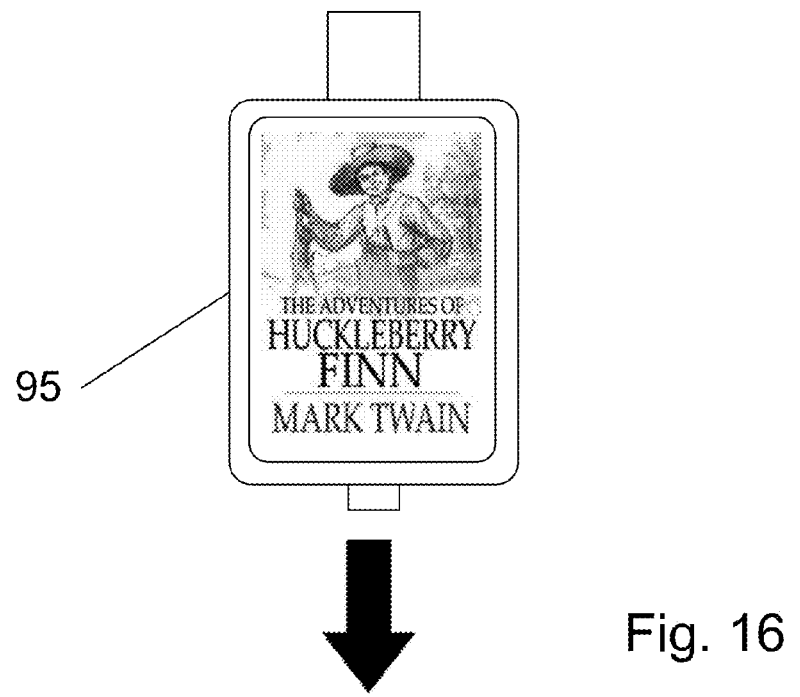
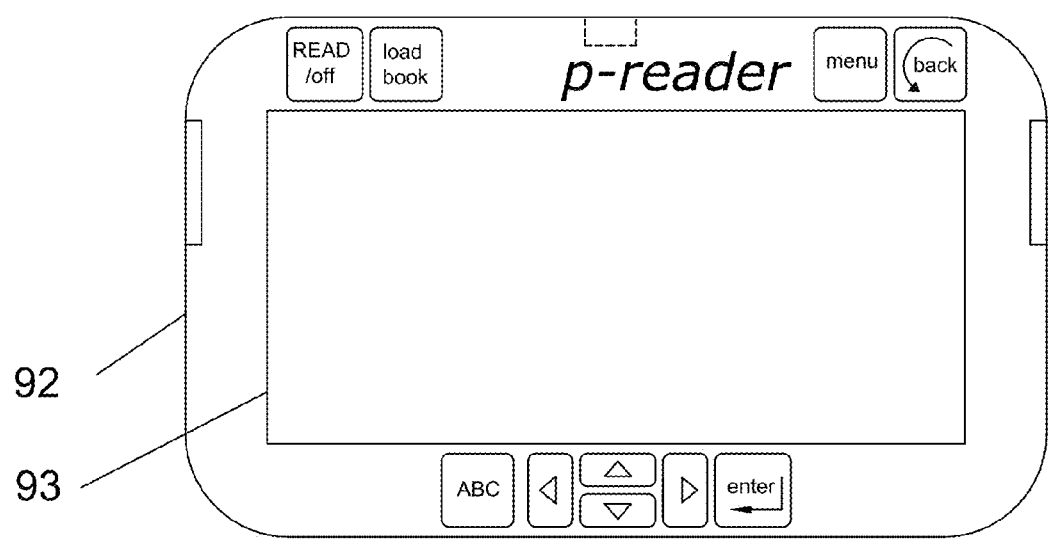
Fig. 16

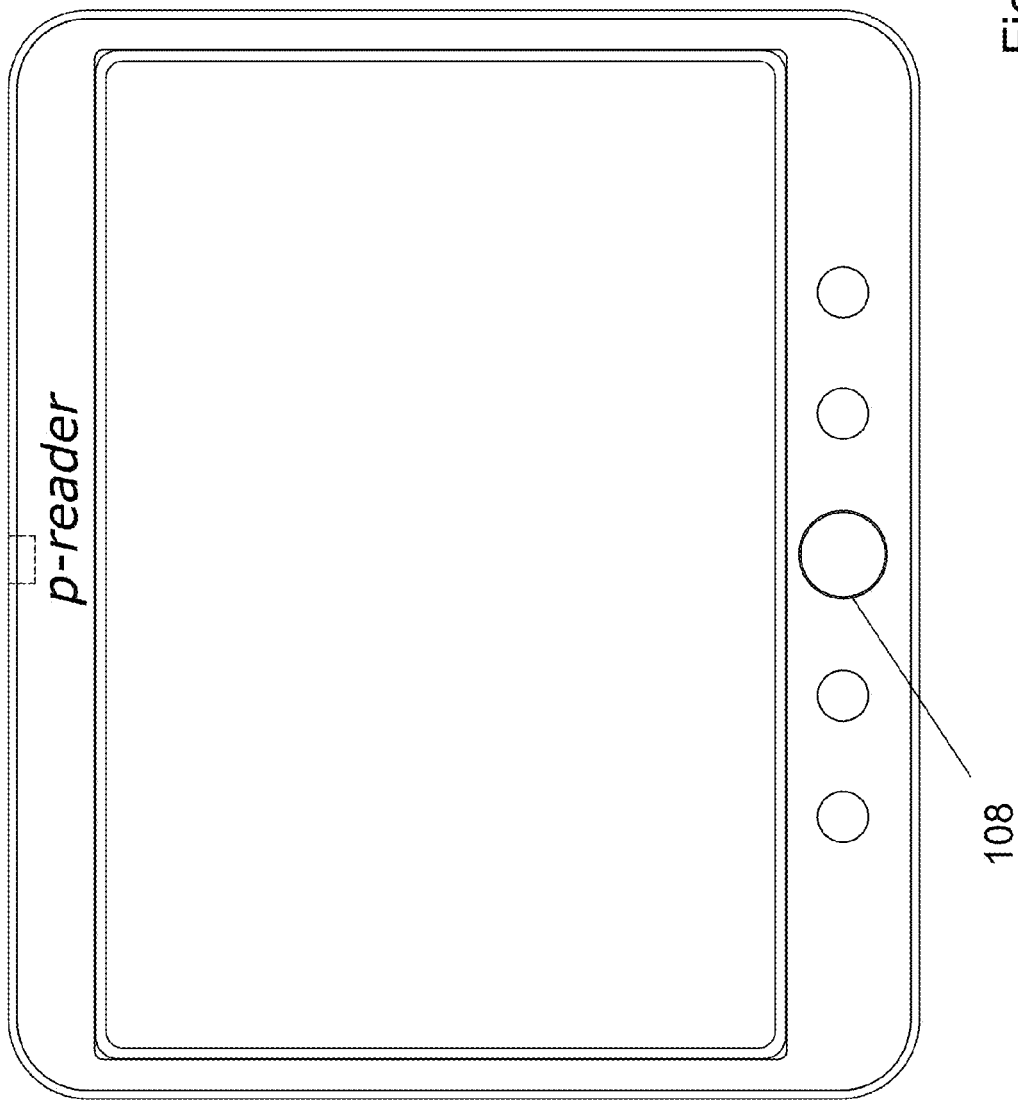

ELECTRONIC MEDIA DISTRIBUTION SYSTEM

FIELD OF THE INVENTION

The invention relates to the field of electronic media including electronic books and electronic readers.

BACKGROUND

Electronic books have grown substantially over the last few years but still the vast majority of books purchased by the public are made of old fashioned paper and ink that people still buy (and are likely to continue buying) in brick and mortar bookstores. One of the main reasons for that is that people are inclined to go to a bookstore to browse through books in the shelves. Browsing through books can be a convenient, efficient and, for many, very enjoyable experience in itself. When finally a book of interest is found, some people would write down the name and order it online when they are back home to get a lower price. However, many people buy the book at the bookstore, perhaps due to uncertainty whether that book can be found in a downloadable e-book format or whether the price of an e-book, if found, will be better than the bookstore price. In addition, many people still don't like to download books or pay online, perhaps feeling intimated by the technology. Finally, buying is still an impulse reaction for many people, and having the book in one's hands is a powerful incentive to actually buying it. Nonetheless, the price of conventional books is oftentimes very high and many consumers balk at that high price. Other consumers actually prefer e-books for easy portability and other reasons.

SUMMARY OF THE INVENTION

In accordance with one embodiment described herein, an apparatus for the conveyance of digital media is provided. The apparatus includes a housing, which can serve as a protective enclosure for electronic components contained within it. A persistent storage device can be positioned within the housing. The persistent storage device is programmed to contain digital media content. The apparatus includes at least first and second connectors of different types. Each is adapted to connect with a digital communications receptacle in an electronic reader device, such as a dedicated e-book reader, a tablet computer running e-book reader software, a mobile phone running e-book reader software, or a computer. In some embodiments, the connectors may be of USB and micro USB types, amongst others. In some embodiments, the connectors may also be alternatively retracted into the perimeter of the apparatus housing, or extended outwards from the perimeter of the housing. One or more labels can be attached to the apparatus, indicative of the digital media content stored therein, and/or instructions for use of the apparatus.

In some embodiments, the persistent storage device may further contain software operable to cause, subsequent to engagement of one or more of the apparatus connectors with an electronic reader device, the transfer of digital media stored within the persistent memory into the electronic reader device. In some embodiments, the apparatus may act to transfer digital media content into any of a plurality of different types of electronic reader devices. The persistent storage device may optionally contain multiple digital media files with similar content, but optimized for different electronic reader devices. In such an embodiment, software may be provided to cause the transfer of a subset of the digital media files to the engagement electronic reader. The subset transferred is based, at least in part, on the optimization of the files for the engaged electronic reader device.

In accordance with other aspects of the embodiments, an apparatus for the conveyance of digital media is provided which also includes a housing serving as a protective enclosure to electronic components contained therein. A storage device receptacle is included, enabling alternate engagement and disengagement of a persistent storage device containing electronic media content. First and second connectors of different types are provided for engagement into receptacles of different types of electronic reader devices. The removable persistent storage device may, in some embodiments, be an SD card.

In some embodiments, the removable storage device may be inserted at least partially into a slot in an exterior surface of the housing. In other embodiments, the persistent storage device is inserted wholly within the housing. The persistent storage device comprises a storage device magnet, preferably positioned towards a leading edge of the storage device; as well as a housing magnet moveably retained within said housing. The housing magnet may be moveable between a first position proximate the storage device magnet, and a second position further from the storage device magnet. The housing magnet may be moved within a groove in the housing between the first and second positions. In other embodiments, the housing magnet may be alternately flipped to provide varying polarities which either attract or repel the storage device magnet.

In other embodiments, the removable storage device can be inserted into a cavity. The cavity can be alternately exposed or enclosed with a removable cover.

In accordance with aspects of further embodiments described herein, an electronic reader device is provided. The electronic reader includes a display screen having a ratio of height to width of between 0.4 and 0.8. The device includes a digital memory adapted for storage of a plurality of electronic books. A digital connector receptacle enables removable engagement with portable digital media storage devices. Finally, a microprocessor is operable to transfer digital content from the portable digital media storage devices, and to display the digital content on the display screen.

Optionally, the apparatus digital connector receptacle may be of a proprietary connector type, thereby limiting the portable digital media storage devices capable of engagement with the digital connector receptacle.

The reader apparatus may also include user interface buttons facilitating ease of operation. For example, a user interface button can be provided (i.e. a LOAD button), the actuation of which causes a microprocessor to transfer digital content from a portable media storage device engagement with the apparatus digital connector receptacle. Another user interface button can be provided (i.e. a READ button), causing the microprocessor to immediately display stored digital media content on the device display screen.

These and other aspects of the embodiments are described further herein below.

BRIEF DESCRIPTION OF THE DRAWINGS

FIG. 3 is a front elevation of a portable digital media device.

FIG. 4 is a top view of said device, while

FIG. 5 is a bottom view of said device.

FIG. 6 is a side view of the portable digital media device, while FIG. 6A is a cross-section of that device.

FIGS. 10A through 10D show a portable digital media device with removable persistent storage, in which the removable storage protrudes from the perimeter of the device housing.

FIGS. 10E through 10H illustrate a portable digital media device with a magnetic system for securing and releasing a removable persistent storage from a device housing.

FIGS. 11, 12 and 13 are top plan views of different electronic readers having various display configurations.

FIGS. 16 and 17 illustrate disengagement and engagement of a reader device with a portable electronic media device.

FIGS. 17A and 17B are front elevations of electronic reader devices having alternate configurations.

DETAILED DESCRIPTION

Figure 1:
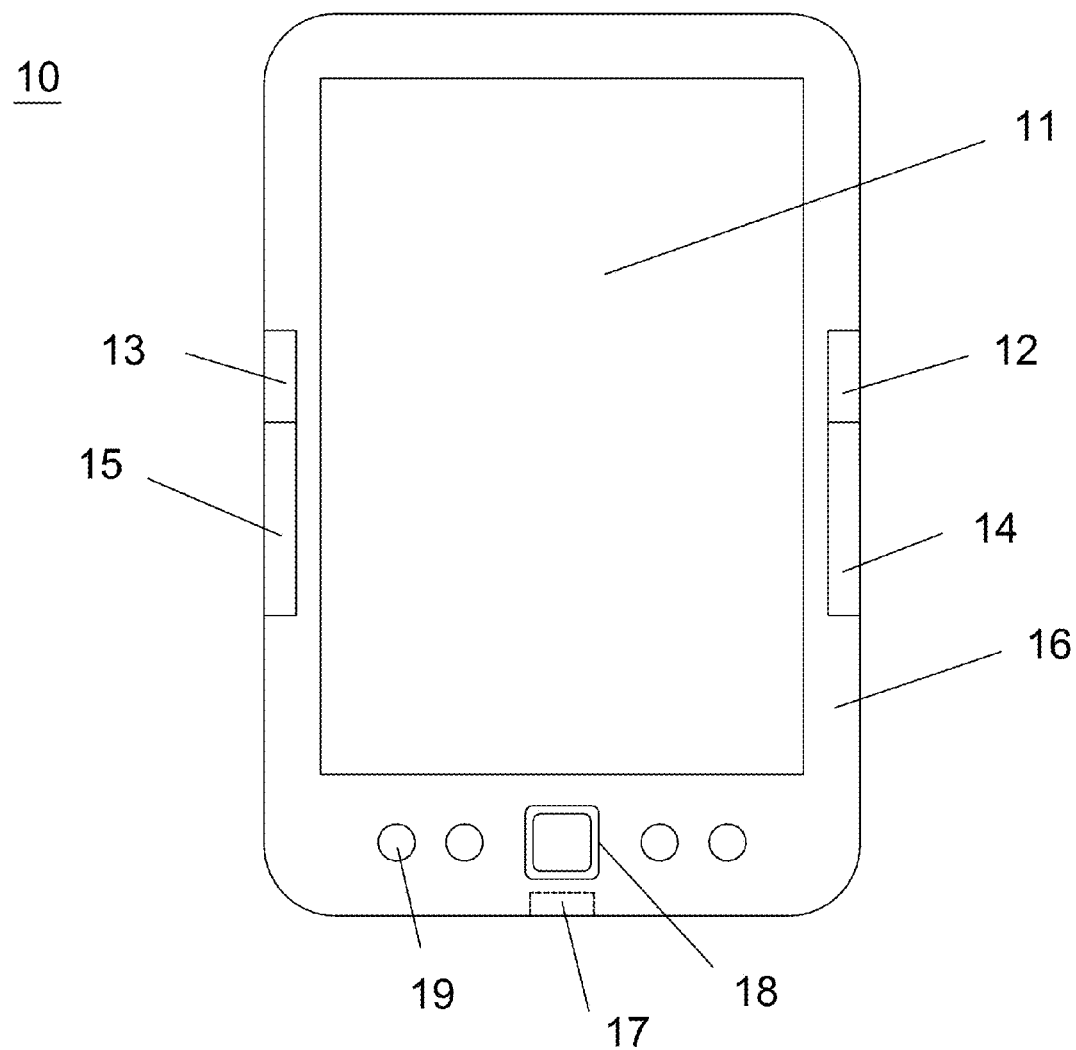
FIG. 1 is a prior art electronic reader device.

While this invention is susceptible to embodiment in many different forms, there are described in detail herein several specific embodiments, with the understanding that the present disclosure is to be considered as an exemplification of the principles of the invention and is not intended to limit the invention to the embodiments illustrated.

In view of the benefits and positive aspects of shopping for books at a bookstore, but also the benefits of purchasing e-books, it may be highly desirable to give consumers a choice at the bookstore whether they want to buy the book they just found in conventional paper and ink format, or in electronic format. Certain embodiments described herein make that and other actions possible by providing, for example, an instantly available electronic book stored in a typically-inexpensive medium (hereinafter sometimes referred to as an m-book, which stands for Mobile Book) that can be read in one or more devices, such as an electronic reader (e.g. Nook, Kindle, Kobo or others), a tablet (such as the iPad), a personal computer (desktop or laptop) and even a mobile phone. In some use cases, the consumer can immediately pick up such embodiments of an m-book at the bookstore (or conceivably at any store, at an airport, at a supermarket or other locations at which books or media can be sold), pay for it at the register and walk away with it. The simplicity and other aspects of the transaction can make that very appealing to many consumers. When the consumer wants to read such content, he or she can, for example, simply plug the m-book into a reader device and the contents of the m-book can be automatically and instantly transferred to the device, which is then ready to be used for reading the transferred content. The system can further include various copyright, anti-piracy protections and digital rights management capabilities.

While e-books may continue to grow in popularity, embodiments described herein may help enable retail bookstores to not only continue to exist, but potentially flourish in an environment in which reading of e-books is growing. The m-book provides the advantage of the browsing experience in the store, a simple transaction, little technology intimidation factor for some consumers and potentially a perceived avoidance of hassle—plus a potentially lower price because of the avoidance of very expensive printing processes. Thus, the future may likely be one of co-existing formats, rather than only one format for all needs. The co-existing formats of the future may include: conventional format (paper & ink), e-books (downloaded over the Internet) and m-books (purchased wherever books or media are sold).

An additional factor potentially impacting use of m-books is that, for many people, books are treasured possessions. A downloaded e-book typically does not provide the physical elements needed to create a collection or library of books. Theoretically the consumer could save the book content on disks, print appropriate label, label the disks and create a library. Most people would not have the time or skill to that. Actually most downloaded books are not even backed up by their users. An m-book would create an attractive, professional way to build a library of m-books, with a backup always present when needed, and accompanied by some peripheral printed information that can accompany the m-book in its packaging such as table of contents, some relevant oriented pictures and other details that matter to book collectors. The same applies to gifts: while a downloadable e-book may not look like an appropriate gift to many people (even though the content may be excellent), an m-book would provide an attractive physical appearance plus a permanent backup that makes it more valuable, and a very desirable gift, in the eyes of many people.

FIG. 1 shows a typical prior art electronic reader 10 such as a Kindle by Amazon or Nook by Barnes & Noble. 16 is the housing of the e-reader, and 11 is the display, typically an e-ink display. Keys 12 and 13 act to page forward, while keys 14 and 15 act to page backwards. Keys such as 19 are used to enter text and instructions, such as the name of a book the user wants to download using the built-in WiFi. The connector 17 is typically a micro B USB connector, which is used to charge the device, but also to connect the e-reader to a computer (in which case the device is typically seen by the computer as one more drive). Keypad 18 is a navigation panel, which moves the cursor up, down, left or right depending on where the user touches it.

Figure 2:
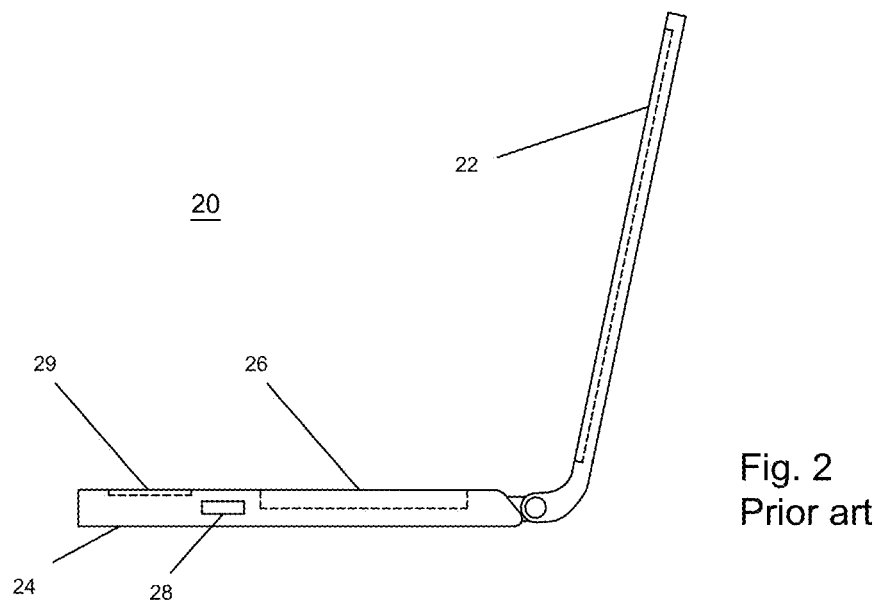
FIGS. 2 and 2A are side elevation and top plan views, respectively, of a prior art portable computer.

FIG. 2 shows a typical laptop computer 20, with an LCD screen 22, a base 24, a keyboard 26, a touchpad 29 and a USB connector 28, which is typically a regular full-size USB type A connector. The LCD screen 22 can serve as an appropriate reading device, except that the computer does not provide the extreme portability of an e-reader and the LCD screen does not work well outdoors or in any bright light environment. On the other hand, the computer does provide a color display, which in some books can be important. For instance, an art book without colors may be impractical for most users. For a textbook a computer can be more useful than a black-and-white e-reader. In summary, the computer is also an important reader device despite its lower degree of portability compared to an e-reader. A tablet (not shown) is also an important reader device, which is being recognized by both Amazon and Barnes & Noble releasing color readers with LCD displays, which are basically tablets.

Figure 2A:
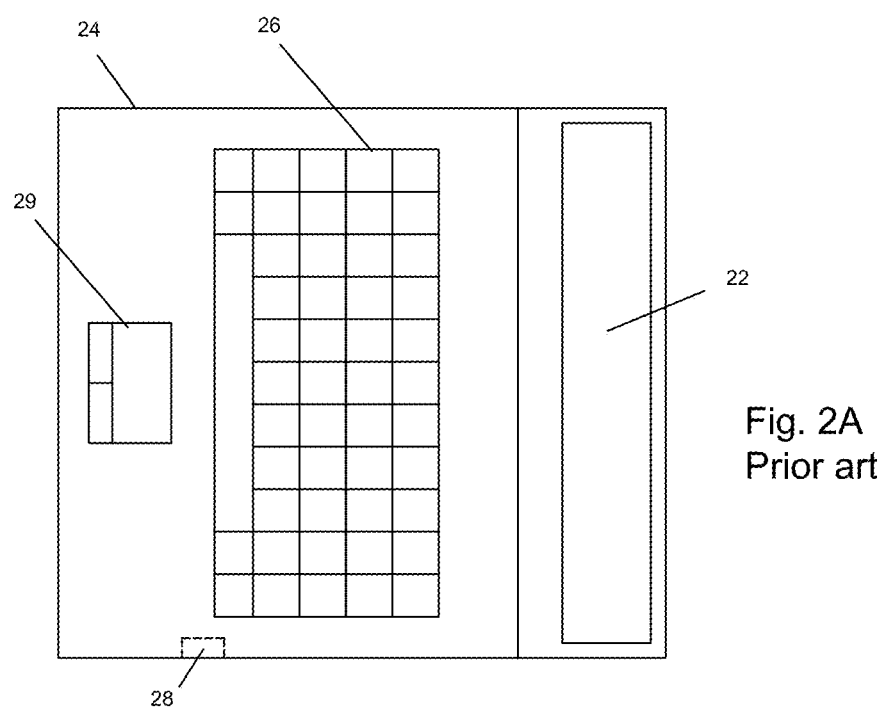

FIG. 2A shows a top view of the computer of FIG. 2.

FIG. 3 shows one of the preferred embodiments of the m-book 30, consisting of a housing 31, a USB connector 33 and a micro-USB connector 34. The label 32 is adhesively attached to the housing 31 to describe the contents of the m-book in an attractive and simple way for marketing purposes. A second label (not shown) can be attached to the backside of the housing 31, opposite label 32, with information such as information about the book, information about the author, summary table of contents, usage instructions for the M-book and/or other information for the buyer. Inside the housing 31 there is a solid state memory (SSM) device that is used to store the m-book contents as well as software and firmware for the m-book operation and DRM (digital rights management) information for copyright protection.

Providing two different connectors 33 and 34, one at each end, allows the user to use the m-book with multiple types of devices having different connectors. For example, m-book 30 can be connected to a device like an e-reader (for instance, a Kindle) using the micro USB connector 34, or a computer using the full-size USB connector 33. These two connectors 33 and 34 can be in a permanently deployed position, as shown in FIG. 3, or alternatively one or both of them can be of a retractable type such that they can be alternatively deployed (as shown) or retracted into housing 31.

Housing 31 can also have additional connectors (not shown in FIG. 3) that can be retractable and protrude axially or laterally, and which can be used for other devices or for other types of connectors (such as a connector for an SD chip, or an HDMI connector, or others).

FIG. 4 shows a top view of m-book 30, illustrating micro USB connector 34. FIG. 5 shows a bottom view of m-book 30, illustrating full-size USB connector 33.

FIG. 6 shows a side view of m-book 30. The switch 36 is used to turn data protection on or off, i.e. when the switch is in Y position ("YES"), the contents of the SSM in the m-book cannot be accidentally erased (in this setting it works only as a read-only device). This feature is optional. In other embodiments, switch 36 can also be replaced with software warnings that are displayed whenever a device tries to write to the m-book SSM or erase its content. In yet other embodiments, writing to the m-book SSM is prohibited altogether.

FIG. 6A shows a cross-section of the m-book. Inside the housing 31 there is a printed circuit board 37, which houses the solid state storage controller 39, the solid state memory (SSM) chip(s) 38 and other electronic components. The connectors 33 and 34 are mechanically and electrically attached to the PCB 37.

Figure 7:
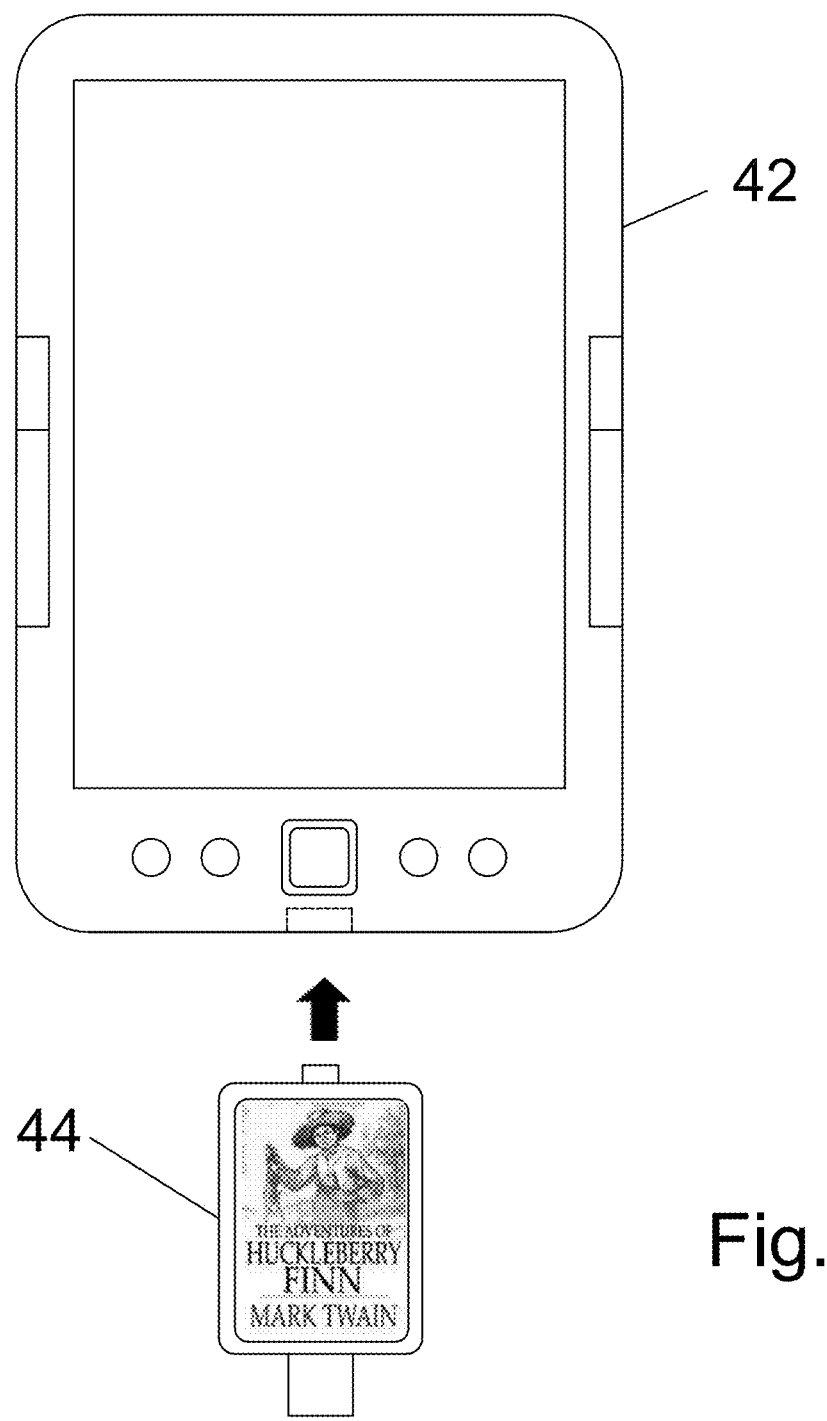
FIGS. 7 and 8 show disengaged and engaged states between an electronic reader and a portable digital media device.

FIG. 7 shows an m-book 44 in the process of being inserted into the micro USB port of an e-reader 42.

Figure 8:
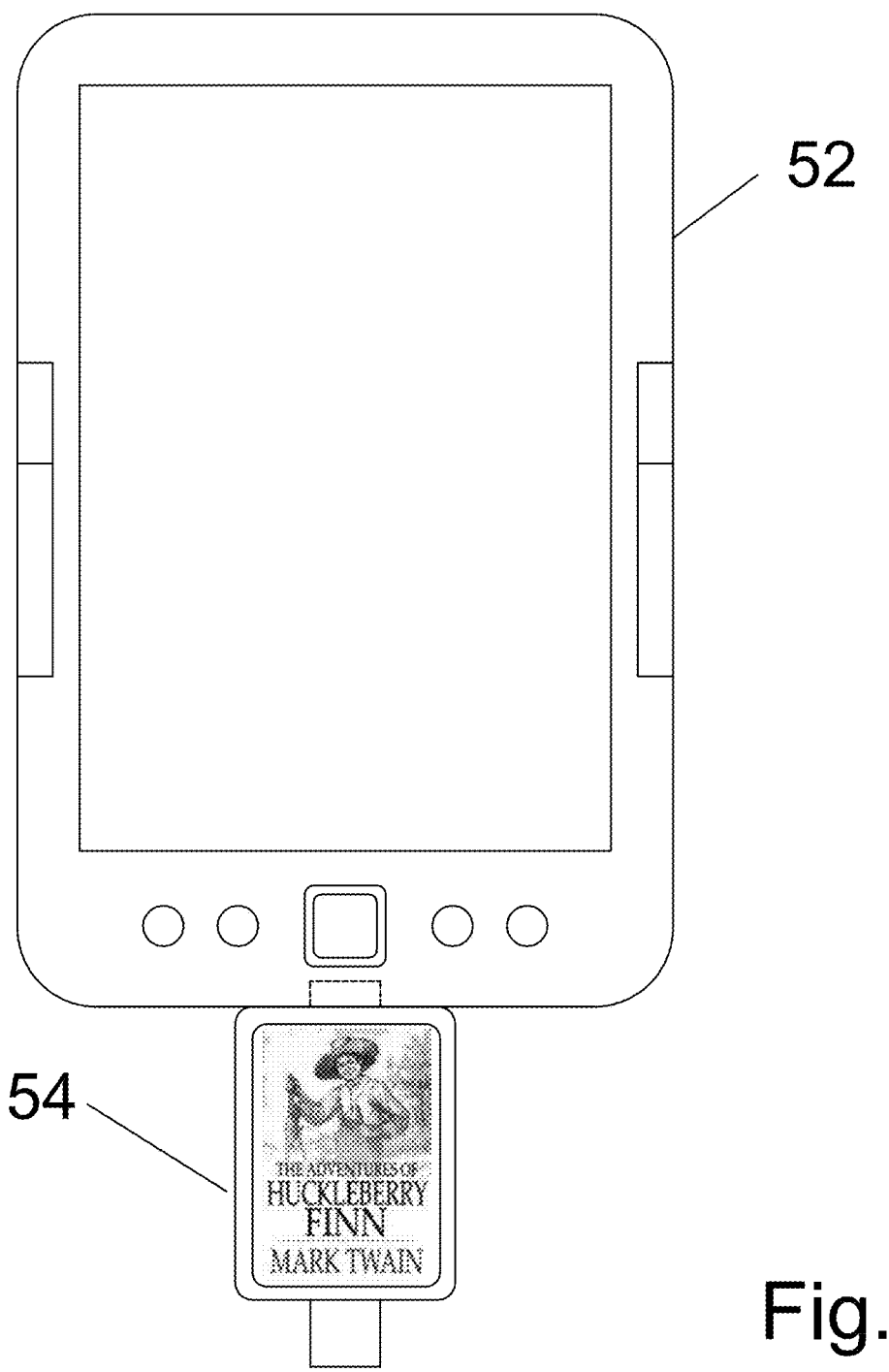

FIG. 8 shows an m-book 54 already inserted into the micro USB port of an e-reader 52. In this position and embodiment, the content of m-book 54 is automatically transferred to the e-reader (unless the user overrides this automatic process with different instructions). Automatic transfer provides convenience to the user, and helps avoid intimidating users with limited experience with electronic devices, or users who just want to read a book, not deal with a computer. In the illustrated embodiment, automated transfer is accomplished via communication between a microcontroller within m-book 54 (not shown, analogous to electronic components on PCB 37 in the embodiment of FIG. 6) and e-reader 52, via the e-reader micro USB port into which m-book 54 is inserted.

Figure 9:
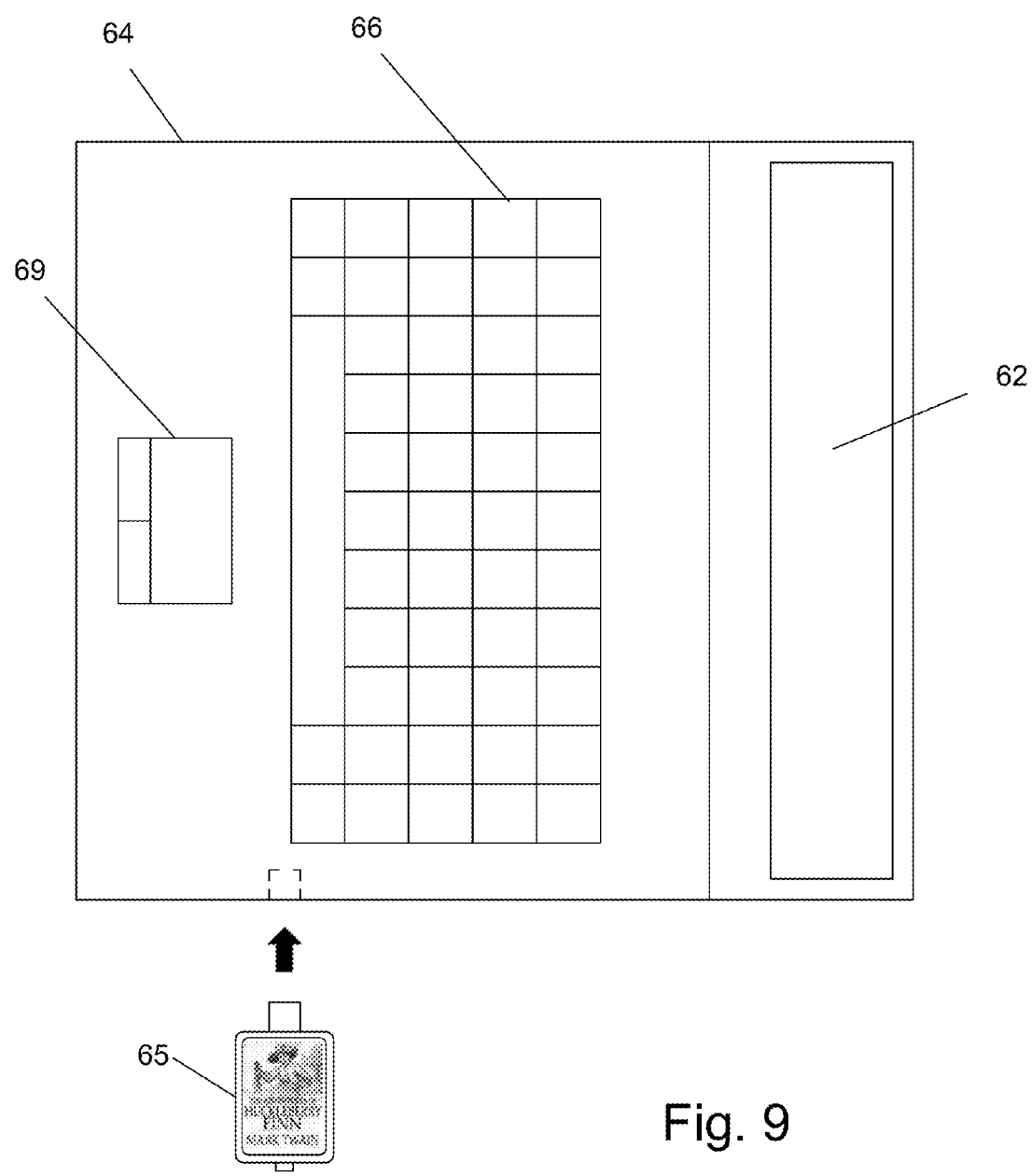
FIGS. 9 and 10 show disengaged and engaged states between a computer and a portable digital media device.

FIG. 9 shows an m-book 65 in the process of being inserted into the USB port of a laptop computer 64 (shown in top view). Laptop computer 64 includes keyboard 66, display 62 and touchpad 69.

Figure 10:
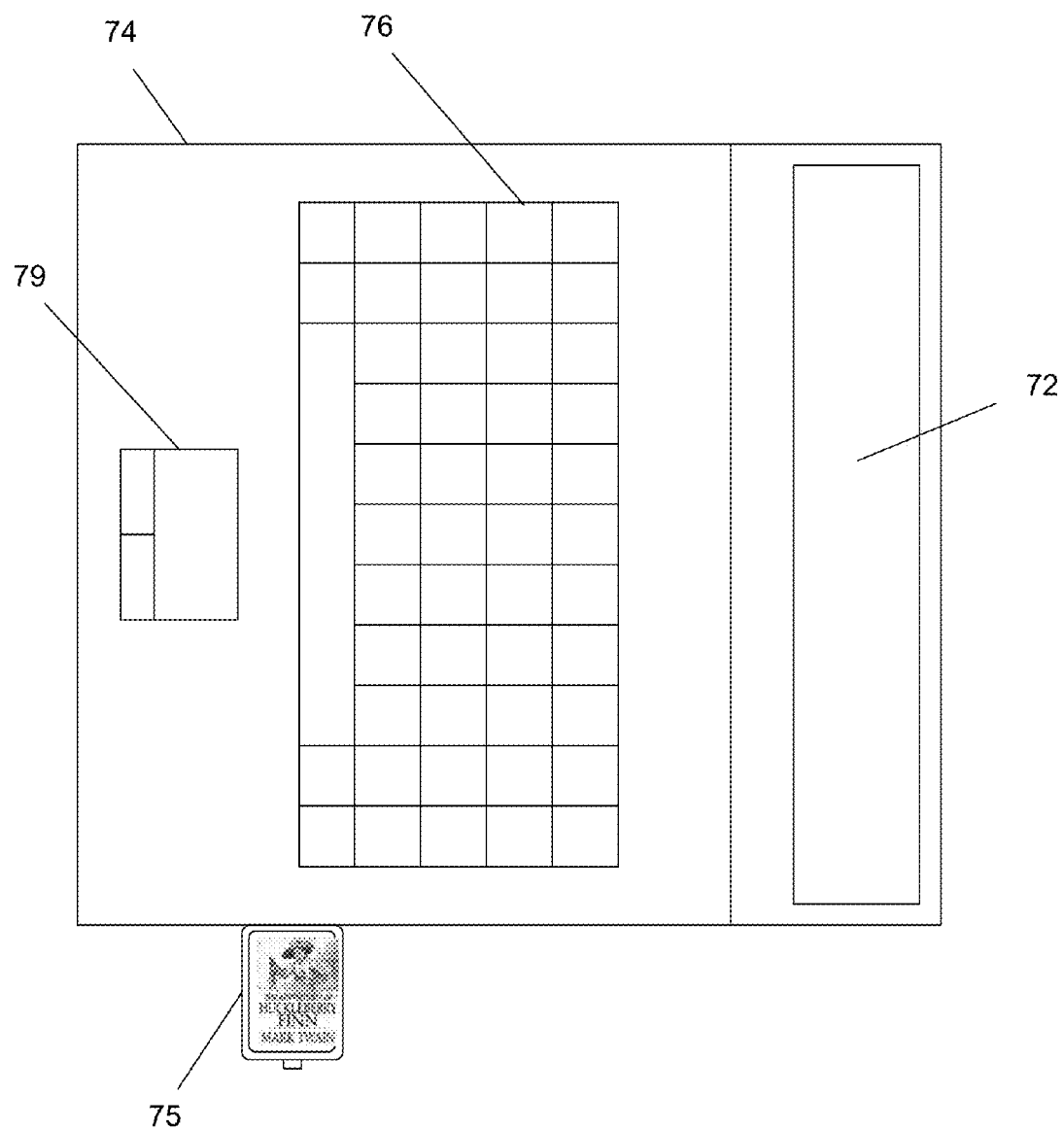

FIG. 10 shows an m-book 75 already inserted into the USB port of a laptop computer 74. In this position, the content of the m-book 75 is automatically transferred to the e-reader (unless the user overrides this automatic process with different instructions) to maximize ease of use. In some embodiments, such automatic transfer can be implemented via the automatic execution of software stored within an SSM of m-book 75.

FIG. 10A shows an alternative embodiment of an m-book, wherein the data storage system inside the m-book is removable. This embodiment can be implemented in different ways. The structure shown in FIGS. 10A and 10B includes the m-book 300 with a lateral slot 310, which serves as a receptacle for a portable data storage system such as a Secure Digital Card 315 (abbreviated SD card), which is a non-volatile portable data storage device with the form factor of a small rectangular flat card.

Figure 10D:
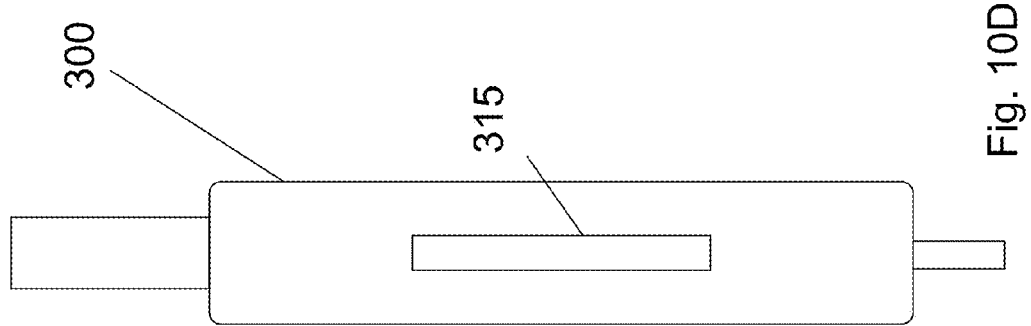
Figure 10C:
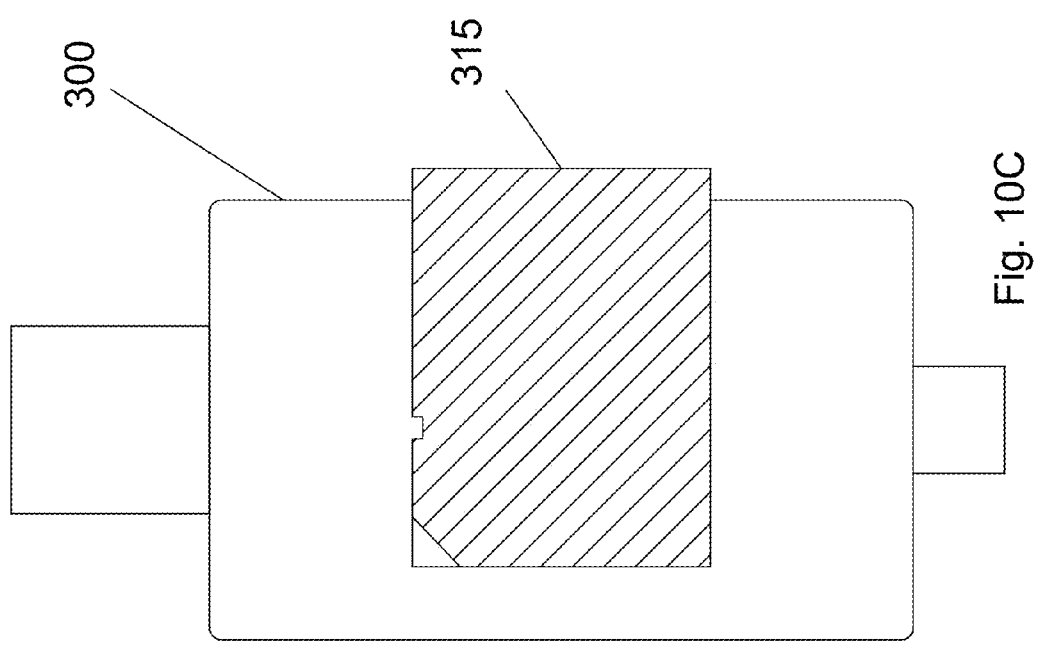

FIG. 10C shows the SD-Card 315 inserted into the m-book 300. FIG. 10D is a side view of the m-book 300 with the SD-card 315 inserted into the device. When SD-card 315 is inserted into m-book 300, USB connector 302 and micro USB connector 304 operate to provide data communications access to the storage capacity of SD-card 315. In some embodiments, m-book 300 will provide communications protocol conversion for USB read/write access to the contents of SD-card 315. In other embodiments, m-book 300 will include a microcontroller and resident software providing additional functionality and/or communications with devices attached to connectors 302 and 304, beyond read and/or write access to SD-card 315.

The embodiment of FIGS. 10A-10D has the advantage of simplicity. It also has the disadvantage that the SD-Card is not totally contained inside the device when inserted into it, as shown in FIG. 10C. SD-Card 315 still laterally protrudes from m-book 300 because the insertion and retrieval method in the embodiment of FIGS. 10A-10D is based on a mechanical toggle mechanism that requires the user to axially push the card into the slot to either insert it or extract it. Therefore, in order to be able to extract it, the card remains protruding from the device. This protrusion may be cosmetically unattractive, and may also pose a risk of accidentally depressing the card, releasing it from the device and potentially losing it. It also poses the risk of people playing with the card and destroying it or losing it, especially when the device is used by children or young users.

FIGS. 10E and 10F show another embodiment of an m-book with removable memory card which allows the SD-Card to be completely enclosed within the housing of the m-book. The SD-Card 350 has a small magnet 345 mounted onto it. The m-book 330 has a lateral slot 340 which serves as a receptacle for the SD-Card, and also a small magnet 320 which is movably located inside slot 335. The two magnets are oriented so they confront each other with opposite polarities. When the SD-Card 350 is inserted into the m-book 330 in FIG. 10G, magnet 320 is positioned within slot 335 proximate SD-Card magnet 345, such that the two magnets attract each other and act to magnetically retain SD-Card 350 inside slot 340. FIG. 10H shows that in order to extract SD-Card 350, magnet 320 is moved to a more distant location from magnet 345, substantially reducing or eliminating the attraction force between them. As a result, SD-Card 350 can be extracted from slot 340 by orienting m-book 330 with slot 340 facing downwards, so that SD-Card 350 falls out of the slot with assistance of gravity and/or a tapping motion. The embodiment of FIGS. 10E-10H can be utilized to avoid the need to have the SD-Card constantly protruding from the side of the m-book housing.

While the embodiment illustrated in FIGS. 10E-H utilizes movement of a magnet within a slot to alter the attractive force between magnets 320 and 345, it is contemplated that other embodiments can be utilized to enable a user to alter the attractive force between an m-book housing magnet and removeable memory card magnet. For example, in one such embodiment, magnet 320 is maintained in the position illustrated in FIG. 10G, but can be rotated by approximately 180 degrees around its center. Such rotation enables the user to reverse the relative polarity between magnets 320 and 345, to alternately provide either attractive or repulsive force between them, thereby effecting magnet securing of SD-card 350 within slot 340, or magnetically-assisted ejection of SD-card 350 from slot 340.

Figure 10K:
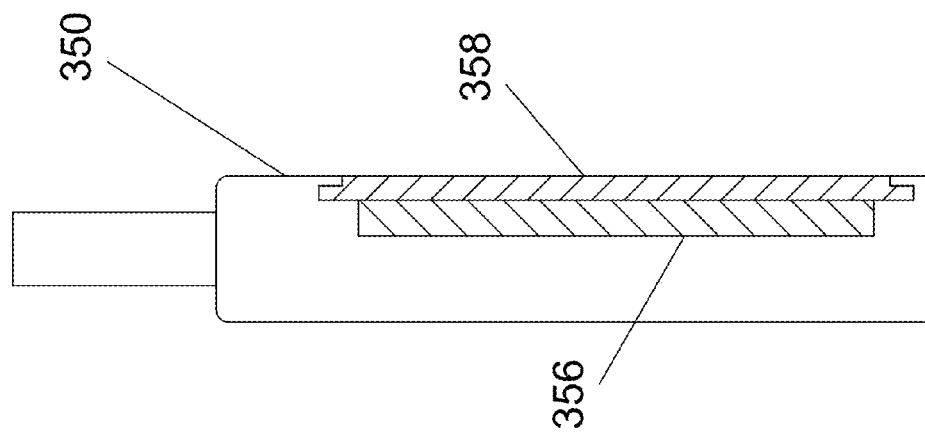
FIGS. 10J and 10K are front elevation and A-A cross-sections of another embodiment of a portable digital media device, in which removable storage can be inserted into the housing and secured by a removable cover.
Figure 10J:
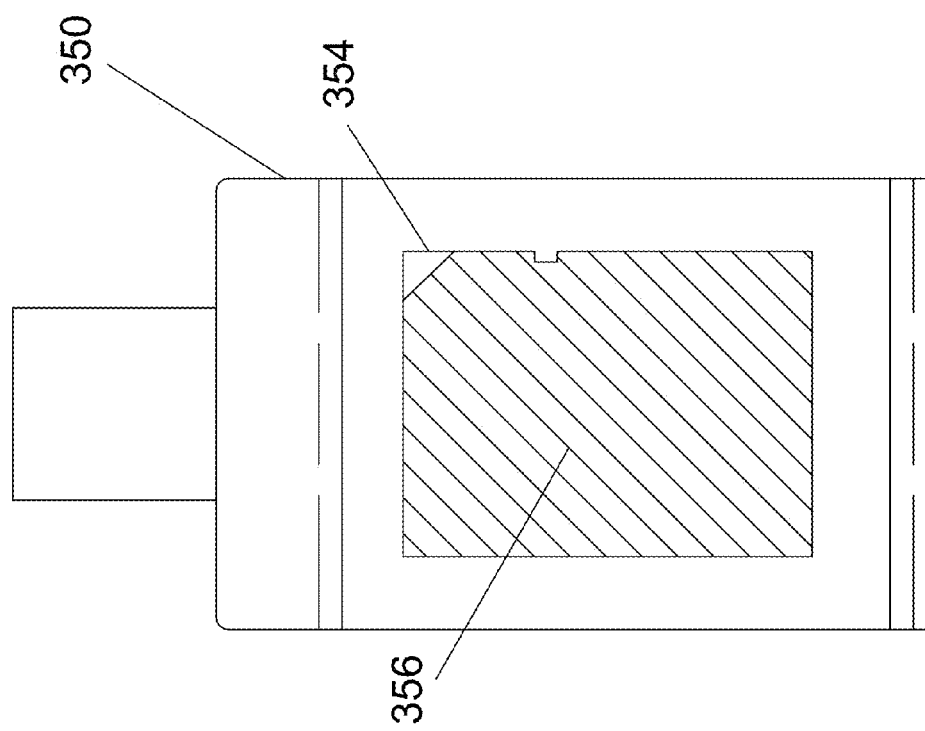

Another embodiment of an m-book which eliminates the lateral slot altogether is shown in FIGS. 10J and 10K. The m-book 360 has a cavity 364, which serves as a receptacle cavity into which SD-Card 366 can be inserted. No mechanical toggle mechanism or magnetic lock mechanism is required. A lid 368 can be removably inserted and removed by a user by sliding lid 368 laterally into the housing of m-book 360. When engaged with m-book 360, lid 368 covers cavity 364 and SD-Card 366 within. FIG. 10K is a cutaway cross-sectional side view A-A of m-book 360, in which SD-Card 366 has been inserted into cavity 364, with sliding lid 368 also inserted into the housing of m-book 360 via a tongue-and-groove engagement, thereby securing SD-Card 366 in place.

The present disclosure contemplates not only the structures and components described so far (such as the m-book in its many different embodiments) but also methods and systems for distribution and sale of electronic media using such structures and components. For example, m-book structures such as those described herein can be further utilized to empower consumers with the ability to shop, browse and instantly buy an m-book and associated digital media content by conducting a simple retail purchase transaction, without requiring downloading of the media content over the Internet. The systems and devices described herein can be utilized to create universal and affordable availability of mobile books for many different users in many different scenarios.

Another important aspect of methods and systems associated with the m-book embodiments described herein is the enticement provided to the consumer for an immediate purchase, because the m-book is instantly available and, in some applications, potentially less expensive than the physical paper & ink books that the consumer is looking at right there in the store. The immediate availability and, if applicable, cost advantages of the m-book provide a strong motivating contrast. Buying books and buying media may be very much driven by impulse, and the m-book model makes it possible for the consumer to follow that impulse immediately, which can be an important marketing consideration.

In accordance with another aspect of some m-book embodiments, providing m-book compatibility with many popular reading devices (such as Kindle, Nook, Kobo, ipad, tablets, laptop computers, etc.), can serve to increase the market for the m-book, since any consumer who has any of those devices becomes a potential buyer. The availability of a standard USB connector also facilitates using the m-book in any computer, which is advantageous in many cases, such as when no e-reader is availability, or when the m-book contains a textbook (textbook are sometimes best used on a computer with a larger screen, with colors and with the possibility of interactive exercises, videos or demonstrations that many e-readers cannot adequately support).

Figures 14, 15:
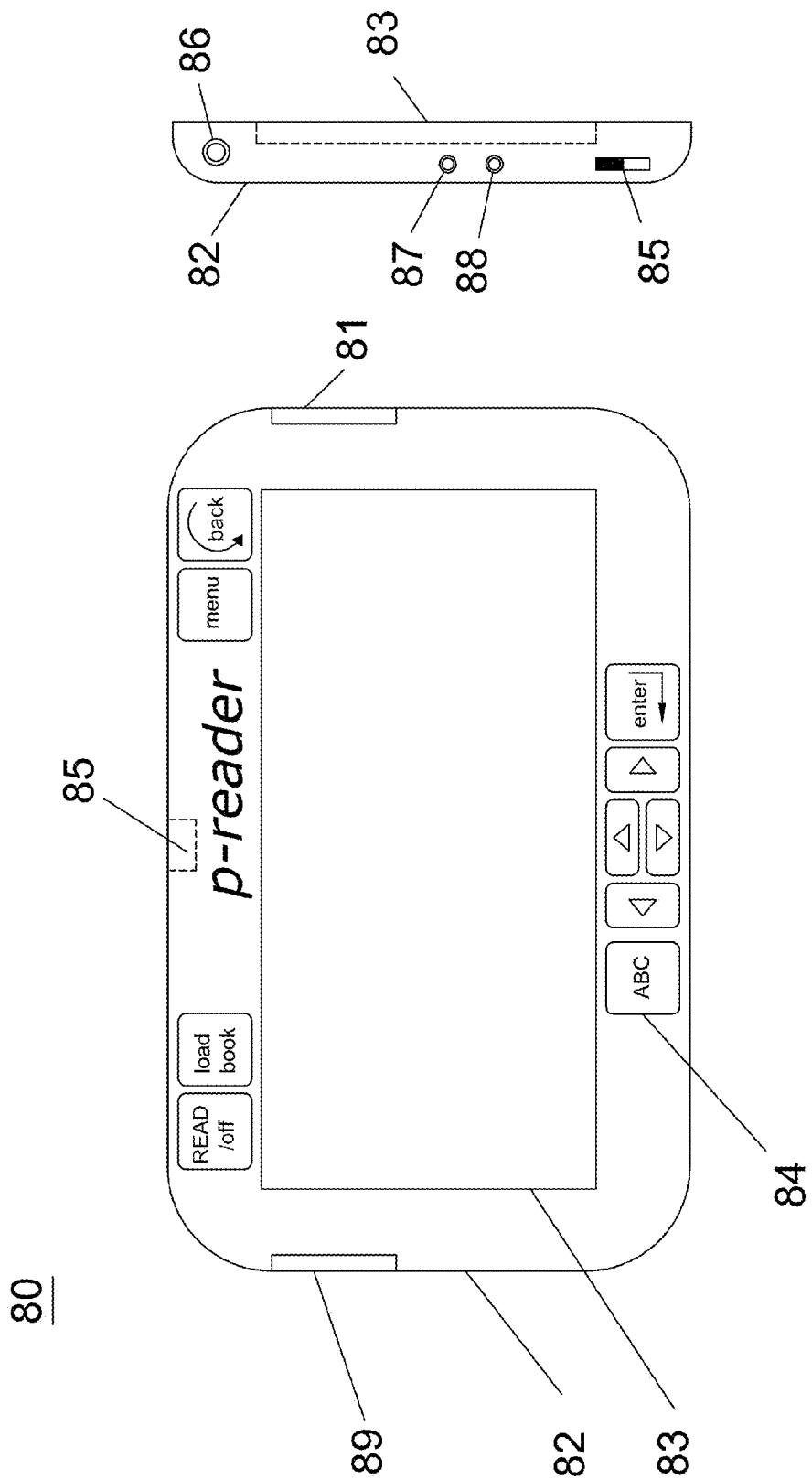
FIG. 14 is a front elevation of a paragraph electronic reader device.
FIG. 15 is a side view of the reader device of FIG. 14.

An alternative, different application of the m-book products is based on providing restricted compatibility, excluding some devices from consideration. For instance, if a company sells books in stores and also sells e-readers, that company may decide to offer an m-book that is compatible only with its own e-reader devices, to incentivize customers to buy its own reader devices, which would create long-term customer loyalty because of the investment in the e-reader. This strategy can be further enhanced if the retailer company can offer a very inexpensive reader device that supports its m-book, because that would entice a large number of consumers to buy that reader device, potentially making it an industry standard. Such a very low-cost device is shown in FIG. 14, which is described further below.

FIG. 11 is used to explain a feature of embodiments that can be used to dramatically reduce the cost of a reader for m-books. The e-reader shown in FIG. 11 is a typical prior art e-reader such as a Kindle. The e-reader 184 has a screen 183, which has a typical elongated shape similar to the shape of a book with a typical screen ratio (quotient between height and width) of 1.4-1.5.

While the elongated screen of FIG. 11 has some advantages, it also has some disadvantages, especially in the area of cost. The most expensive component in an e-reader may often be the display, and the cost is generally proportional to the size of the display. Therefore, a large display is in conflict with the objective of an ultra-low cost, universally available e-reader.

Further embodiments described herein provide an ultra-low cost e-reader device for m-books, also called the paragraph-reader (p-reader). It is based on the empirical realization that it is not necessary to display a full page of information for the reader. Actually showing a paragraph (typically ⅓ to ½ of a page) is typically sufficient, and it may actually be easier on the eyes of the reader in many cases. In the process of reading, all readers take their eyes from the book from time to time. Resuming reading is actually made more difficult and tiring with a large amount of information displayed rather than with a smaller, more focused amount of information. It is believed that a paragraph-reader can be more convenient, more effective and less eye-straining for many users and for many books. This is not true of all books, especially of those that require constant jumping back and forth when a very complex context that requires constant re-reading of previous paragraphs for comparison with previous facts and references. However, those types of books are infrequent and lend themselves better to a computer rather than an e-reader. In most cases a p-reader (paragraph reader) is ideal for most consumers from the point of view of convenience, portability, reading effectiveness and, last but not least, cost. The biggest cost element in an electronic reader is usually the display, and a smaller e-reader display has a substantially lower display cost. Therefore the p-reader can provide a significant cost advantage because of the reduced display size.

FIG. 12 shows a p-reader with a screen ratio of height to width of approximately 0.7, which corresponds to about half the screen size shown in FIG. 11. Typically a reader cannot instantly read a complete large page such as the large screen of FIG. 11, and therefore displaying such a large amount of information at all times may not be necessary. Even charts, exhibits and pictures often do not occupy most than half a page, so it is unnecessary in many cases to provide the large screen of FIG. 11. The much smaller screen of FIG. 12 is generally easier to read, easier to focus and refocus, more portable and convenient, and less expensive.

FIG. 13 shows a p-reader with a screen ratio of approximately 0.4 to 0.5, which corresponds to a screen about ⅓ the size of typical prior art e-reader screens. This size is ideal for portability, and readability is still excellent.

It has been determined that a ratio approximately between 0.4 and 0.7 is ideal for convenience, reading comfort and cost.

The p-reader embodiment of FIG. 14 is a small, highly portable device (with a length of approximately 114 mm and a width of approximately 68 mm, which corresponds to about ⅓ the size of current e-reader screens), which fits easily into the pocket or purse of most users. The p-reader of FIG. 14 has a housing 82, a display 83, a simple keyboard 84 and a connector 85, which is typically a micro USB type B connector. With respect to the display 83, the preferred type would be an LCD device, which can be either color or black and white. LCD devices tend to be lower in price than e-ink screens because of the much higher production volumes, so the preferred embodiment of the p-reader would be based on an LCD. For outdoor users an e-ink version at a slightly higher price could be made available. The outdoor version would also have the advantage of a much longer battery life, because e-ink displays consume electricity only when in transient stage, for instance, while switching from one page to the next.

With regard to wireless capabilities, the p-reader in its preferred embodiment will not have such capabilities, because they are not considered essential for the ultra-low cost version of the device (this is different from current e-readers in existence). The loading of media, such as books, into the p-reader is intended, by definition, to take place through the port 85. In addition, if there ever was a need or wish to communicate wirelessly with the p-reader, that can be easily done by plugging the p-reader into the USB port of a computer: the p-reader is seen by the computer as a drive and the wireless capabilities of the computer can be used to transfer data or e-books into the p-reader. Avoiding WiFi/wireless capabilities in the p-reader translates into an additional substantial cost and complexity reduction. Of course it is conceivable to also offer a higher price version of the p-reader with wireless capabilities.

Preferably, the p-reader device illustrated in FIG. 14 is implemented using an open-source operating system, such as Linux, to minimize costs. However, it is also contemplated that other software could be utilized as the basis for the p-reader operation, such as Android or a Microsoft operating system.

Due to the described changes with respect to prior art e-readers, the p-reader is able to achieve an unprecedented low cost level. This is a big enabler for methods and system for distributing media disclosed herein, because the p-reader can potentially be provided to customers for free with a minimum purchase (for instance, with the purchase of three m-books). That can increase the market for the m-book and the p-reader in a dramatic way.

In addition, the p-reader with its ultra-low cost level will be within the affordability level of most people, making inexpensive m-books universally available. This is particularly important in low income areas of the world, but even in industrialized areas such as the U.S. and Europe the m-book could provide substantial relief to students of every age from the very high cost of textbooks (and this could be done without sacrificing retail margins, because the lower prices would not rely on lower margins but rather from actual cost reductions (avoidance of paper, ink, expensive processes and very expensive plant and equipment).

Another important feature for the universal adoption of the p-reader is the user-friendliness of the user interface. The user interface of prior art e-readers (such as the one shown in FIG. 1) can intimidate and overwhelm users, depending on their computer familiarity, education level, age and other factors. The cryptic icons on the buttons of FIG. 1 may be puzzling for many users, particularly those without significant experience using computers or electronics, who can give up. The user interface of the p-reader is extremely simple, and includes a button 84A labeled "READ", to enable reading functionality without having to navigate through menus to get there. The READ button 84A also works as a toggle power button, turning on the device immediately when pressed by the user, without having to start a search for a concealed power button. The device can be turned off by pressing the READ button 84A again. In some embodiments, the user will be made aware of the toggle off functionality by displaying a message to the user when the device is turned on.

Another button is the "LOAD BOOK" button 84B, which when pressed, displays messaging on display 83 directing the user to insert an m-book into port 85 for automatic loading, at which point content of an inserted m-book is loaded into reader 80.

For other tasks, the MENU button 84C offers a number of simple options. The Back button 84D allows the user to go back to the previous stage at any time.

The buttons 84 near the bottom edge of the device allow the user to enter text and move the cursor around.

The user interface of the p-reader is based on the assumption that a universal device should be universally understandable and usable without a manual and without a long learning curve, for users of varying age, education, income and geography.

FIG. 15 shows a side view of p-reader 80, with a power switch 85 (optional, since the READ button can be used as a power switch too), an optional charger connector 86 ((optional because the USB connector can be used for charging with any computer) and optional audio jacks 87 and 88 (optional because audio is not required for book reading, but it could be important for m-book versions with content different than plain books, such as audio books, music and video).

FIG. 16 shows the m-book 95 being inserted into p-reader 92.

Figure 17:
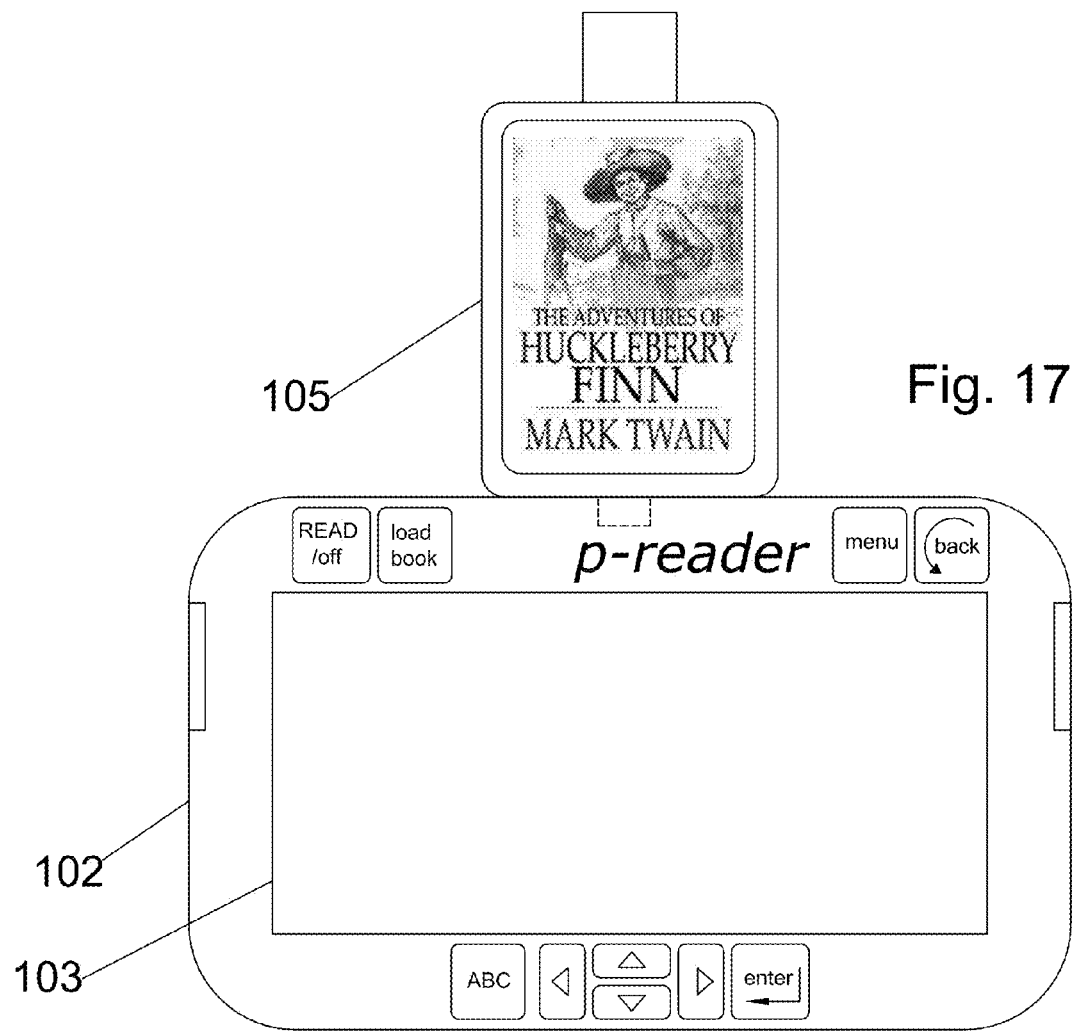

FIG. 17 shows the m-book 105 already inserted into p-reader 102. When the m-book is inserted, the content is automatically loaded into the p-reader (unless the user overrides that process). Then the user can remove m-book 105 and start reading. If the p-reader's memory is full and the user doesn't want to delete files to make space, it is possible to leave the m-book inserted in the p-reader and read directly from it.

Figure 17A:
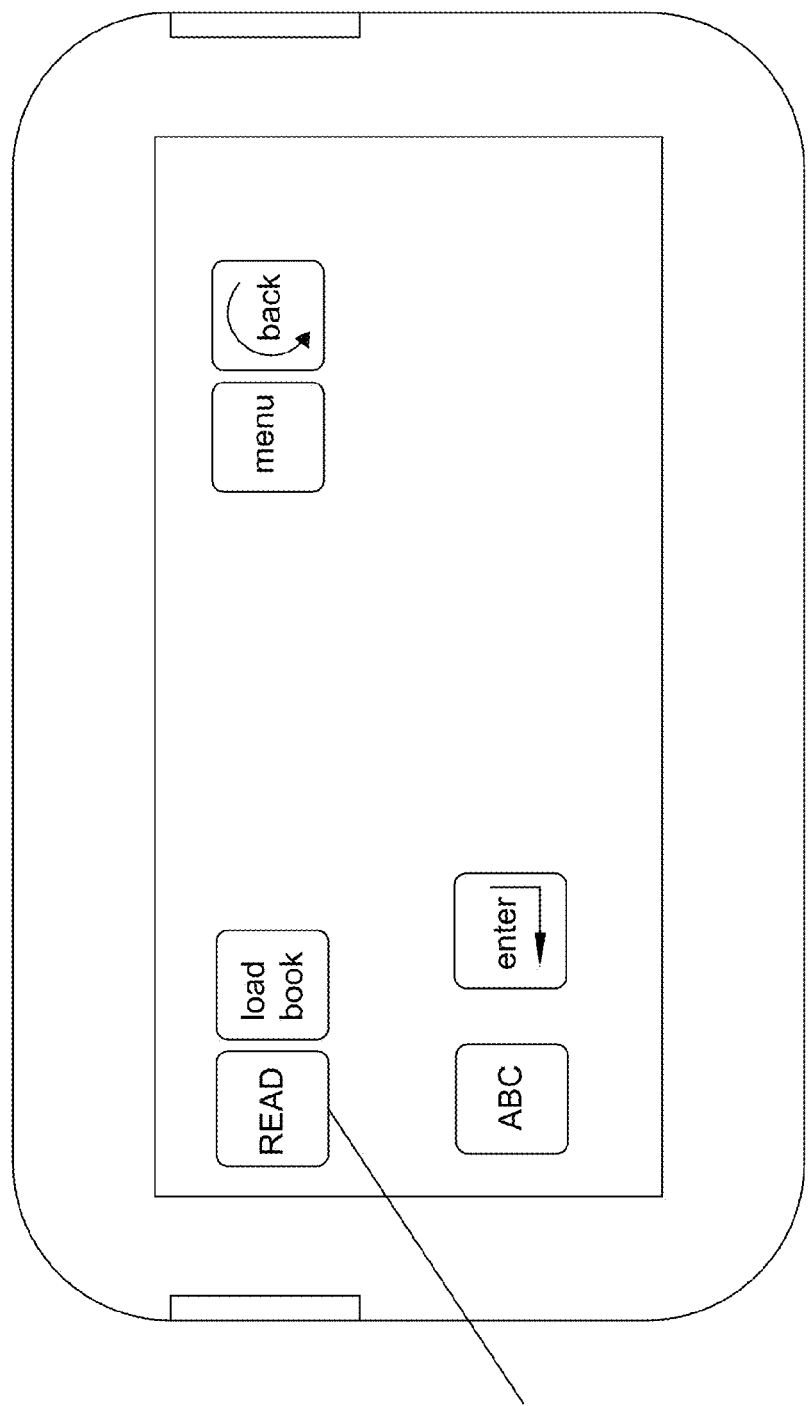

FIG. 17A shows a p-reader with a touchscreen 107. Touchscreen 107 displays a user interface including virtual buttons such as virtual READ button 106 for its operation.

FIG. 17B shows another embodiment of the p-reader, which includes a trackball 108 as the navigation device for the data entry cursor, and buttons for additional functionality.

Figure 18:
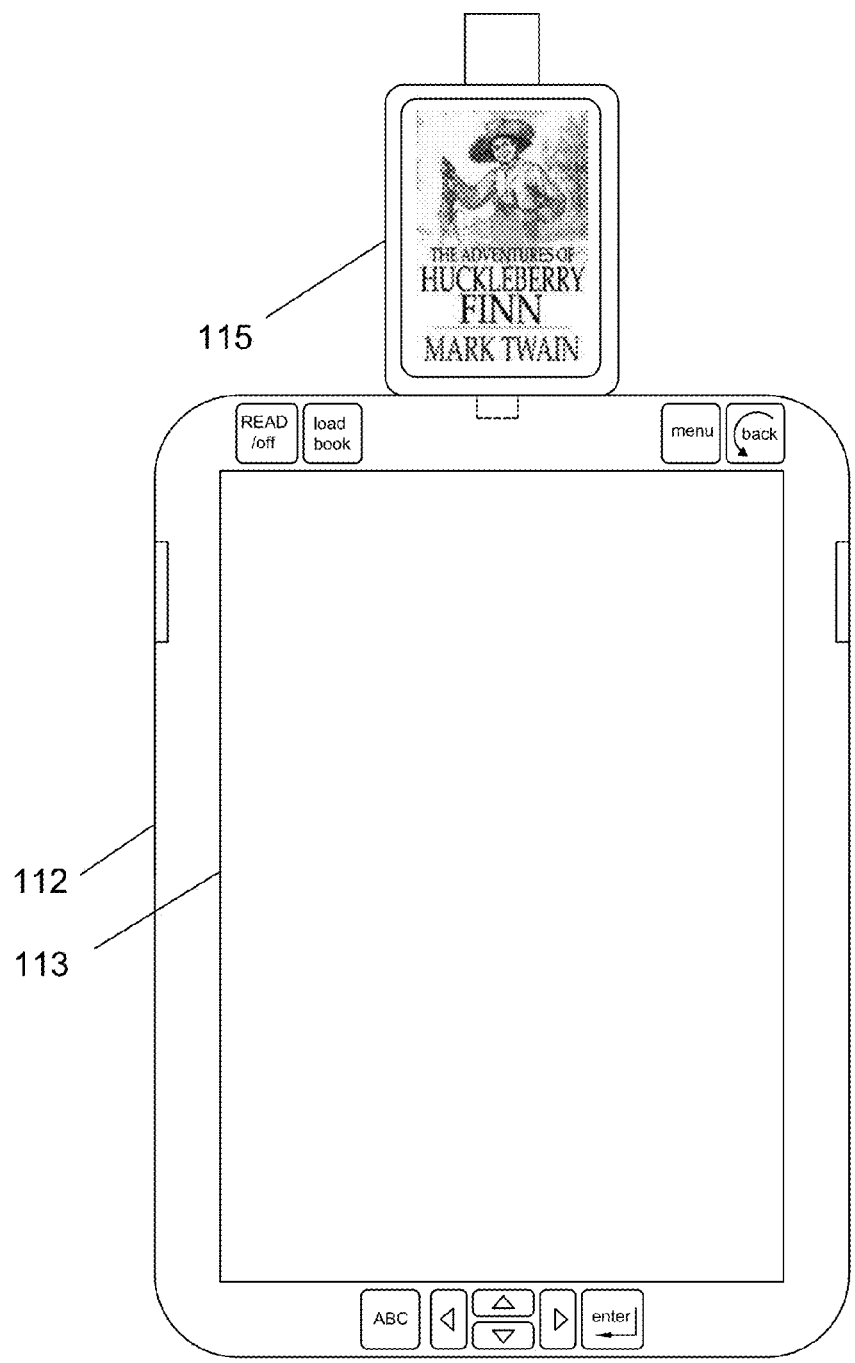
FIG. 18 illustrates engagement of a portable electronic media device with a reader device.

FIG. 18 shows a large screen version of the p-reader, intended for users who are less cost-sensitive and for whom the larger screen may be significant for special needs, such as the need to display large pictures, graphs, etc. The same type of user interface described above in connection with the embodiments of FIGS. 14-17B can be used with this larger screen.

It is also possible and advantageous to use the m-book also for audio content (such as music) and video (such as movies and games). The cost of solid state memory has reached a point that it can compete with great advantage against mechanic/analog recording and playback methods such as CDs and DVDs. The m-book in this situation offers the advantage that it is less susceptible than CDs and DVDs to damage from contact, heat or other influences. The m-book embodiments described herein are also smaller, easier and cheaper to transport and store compared to CDs and DVDs. They also offer advantages in terms of dynamically adjustable content, interactivity, pausing, replaying and fidelity. The solid state playback devices do not require electric motors (which can introduce mechanical and electrical noise) or movable/wearable parts, and offer extended service life without failure.

Figure 19:
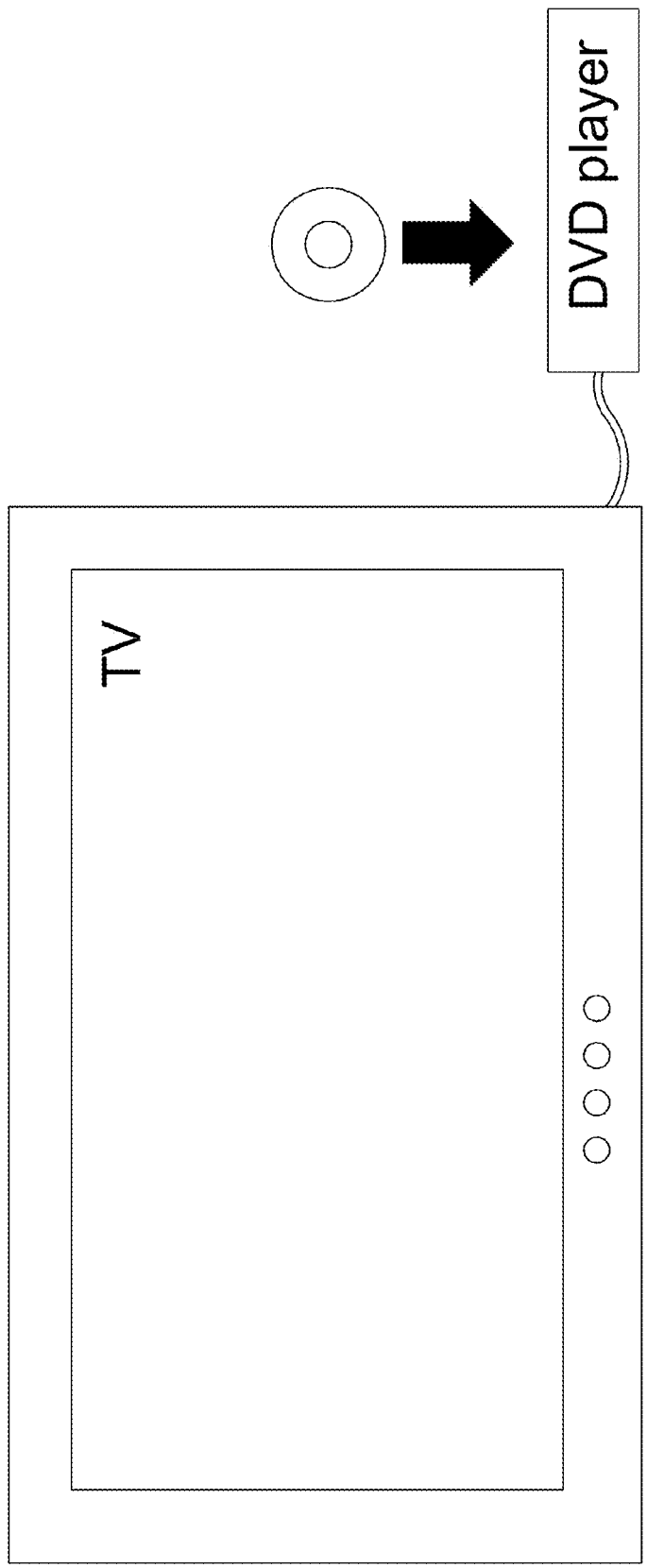
FIG. 19 illustrates a prior art system for viewing video content.

FIG. 19 shows a typical prior art television configuration, with a DVD 120 being loaded into a DVD player 122, which is connected to the TV set 124.

Figure 20:
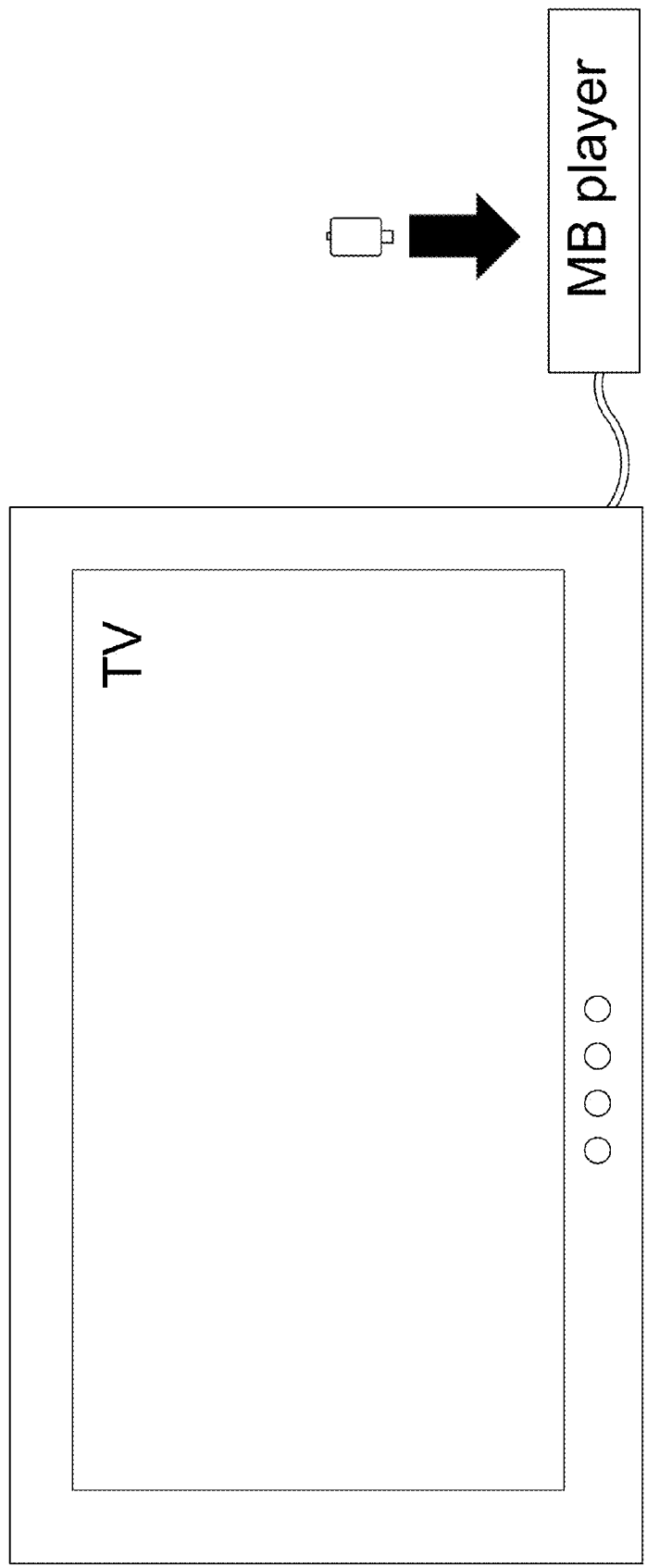
FIGS. 20 and 21 illustrate embodiments of systems for playback of video content from portable media storage devices.

FIG. 20 shows a new alternative television configuration that can be used in conjunction with the m-book. An m-book 126 containing a video file is loaded into an MB-player (m-book player) 128, which is a digital, solid state playback device without moving components. The signal generated by the MB player is transferred to the TV set 130 (through cable 132 as shown in FIG. 20, or wirelessly).

Figure 21:
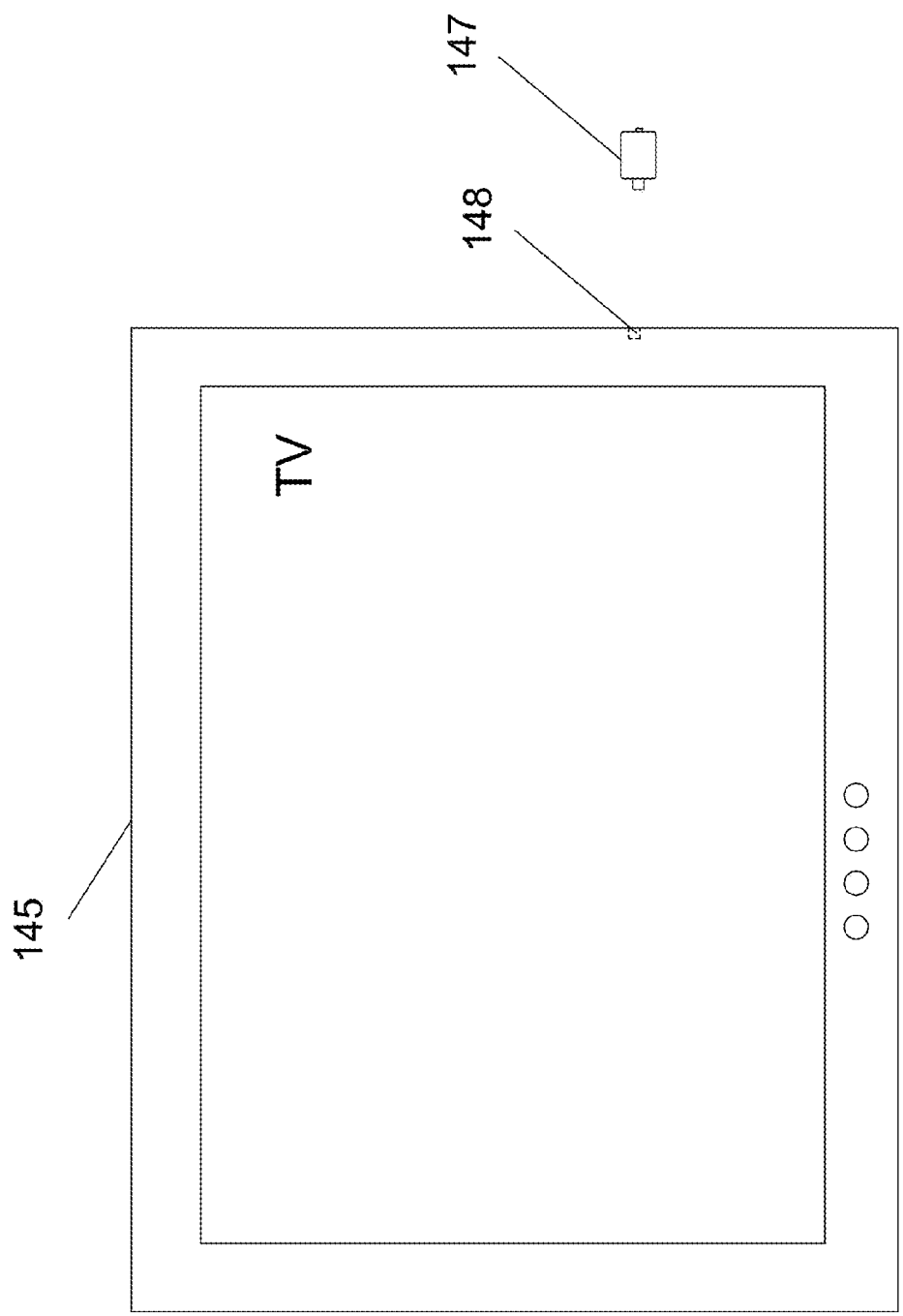

FIG. 21 shows a new type of television 145 that has a mating connector 148 (such as a USB connector), where the m-book 147 can be plugged directly into, providing the ability to play the content of the m-book on the TV system.

Figure 22:
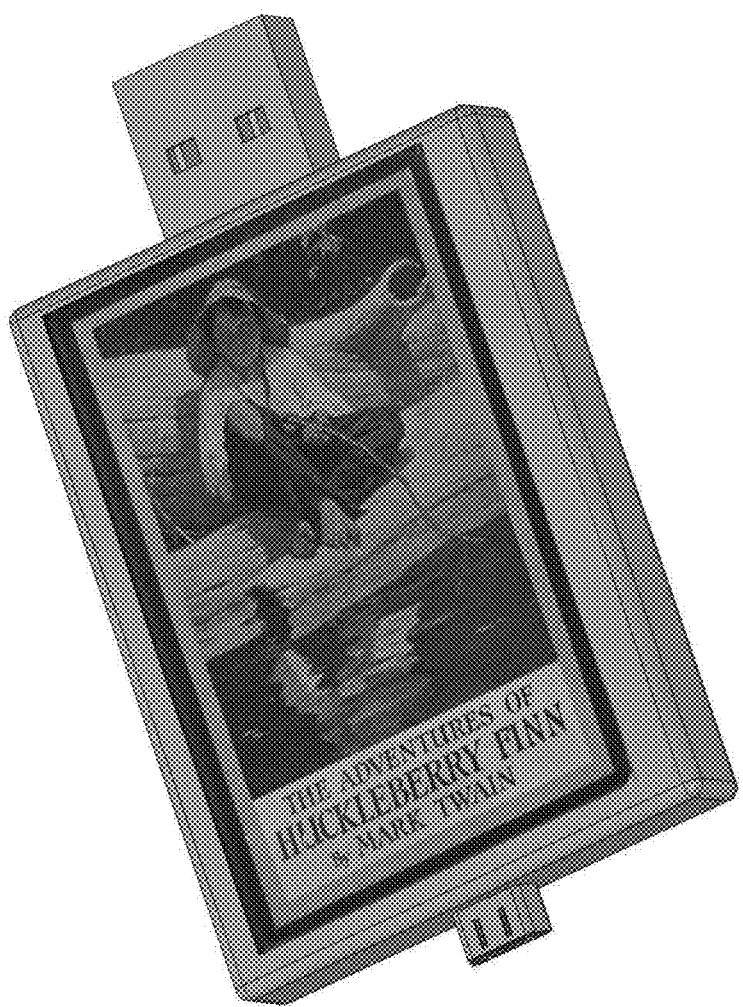
FIGS. 22-28 illustrate various examples of portable media storage devices
Figure 23:
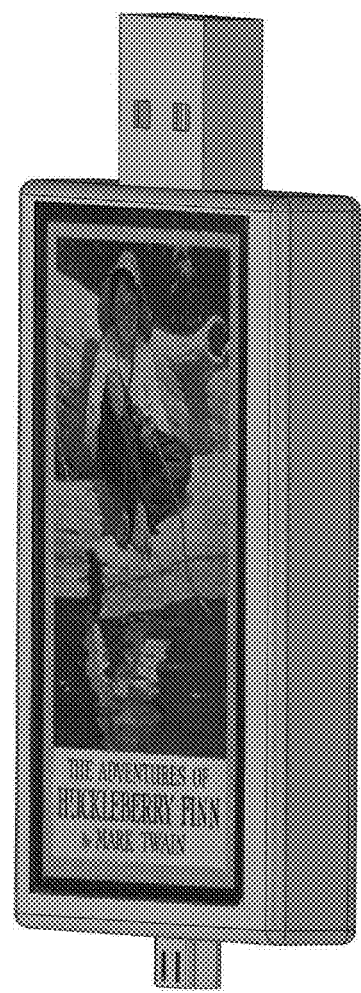
Figure 24:
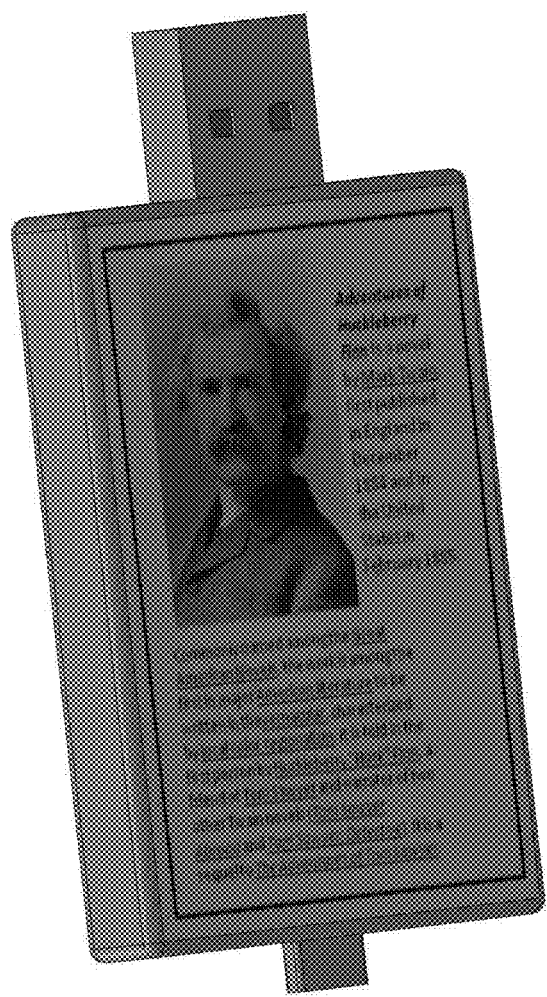

FIG. 22 shows a perspective view of an m-book. FIG. 23 shows another perspective view of an m-book. FIG. 24 shows the back of the previous m-book, which has a label with information about the author and book.

Figure 25:
Figure 26:

FIG. 25 shows a perspective view of an m-book containing music. FIG. 26 shows the back of the music m-book.

Figure 27:
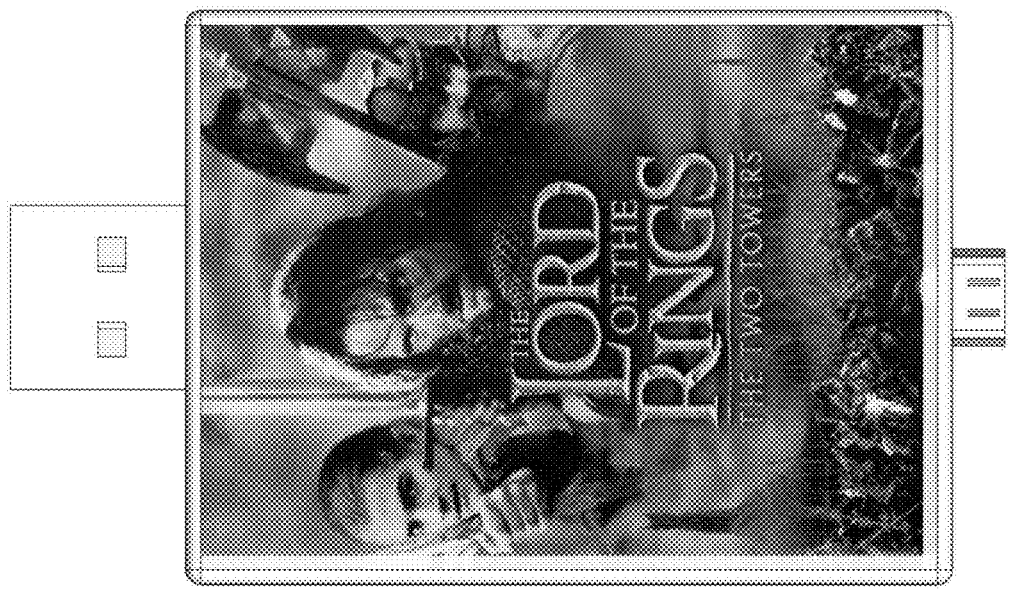
Figure 28:
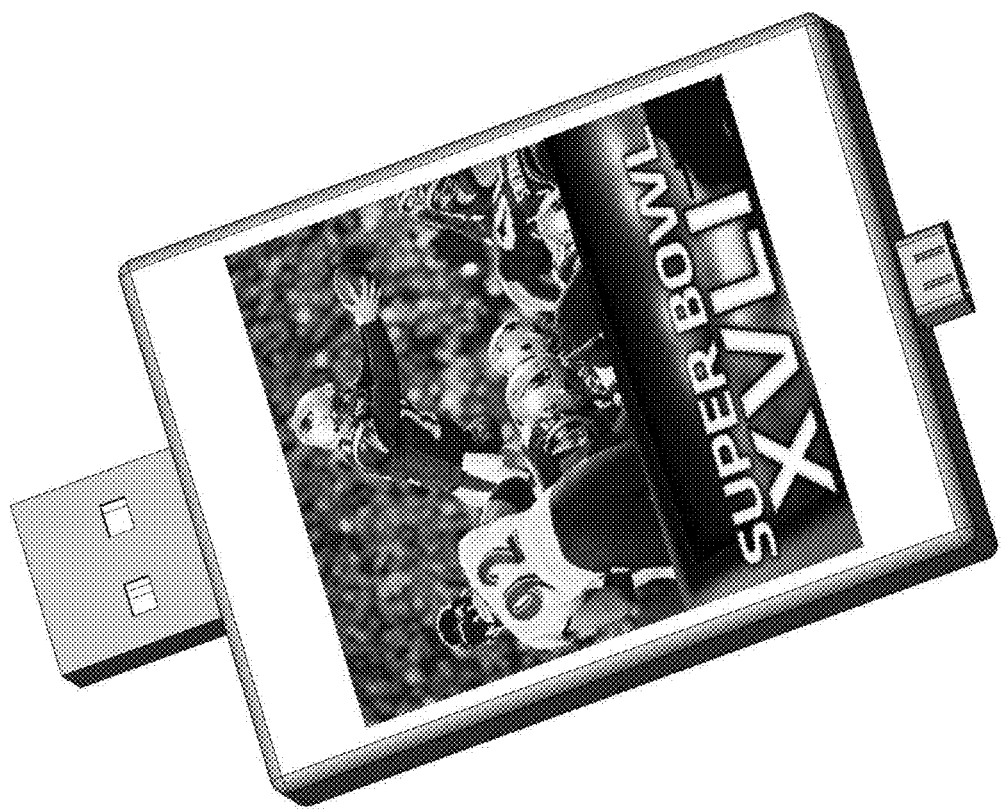

FIG. 27 shows a frontal elevation view of an m-book containing video media content. FIG. 28 shows a perspective view of a sports video m-book.

Figure 29:

FIG. 29 shows an embodiment of a retail package for an m-book. The package consists of a hang card 160, with a transparent plastic area 162 that permits users to see m-book 164 contained within.

Figure 30:
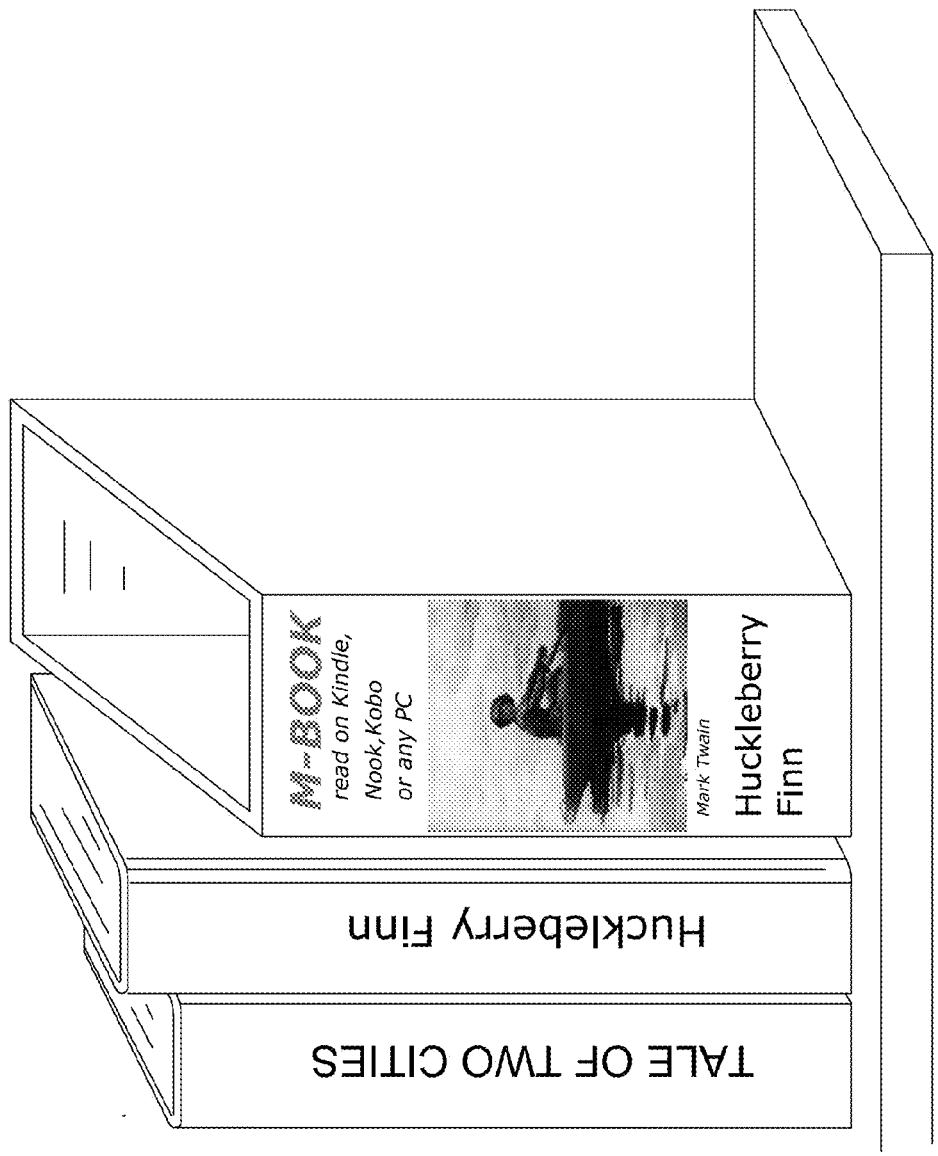
FIGS. 30-32 are perspective views of retail displays for portable media storage devices.

FIG. 30 shows an embodiment of a retail display to the sale of m-books on bookstore or retail shelves. An m-book container 166 is sized to removably house a plurality of individually-packaged m-books, such as the hang cards of FIG. 29. Preferably, display container 166 is positioned within a retail display, proximate hardcopy book 168 containing the same content, in printed form, as the m-books contained within the display container. Display container 166 is illustrated in an empty state in FIG. 30.

Figure 31:
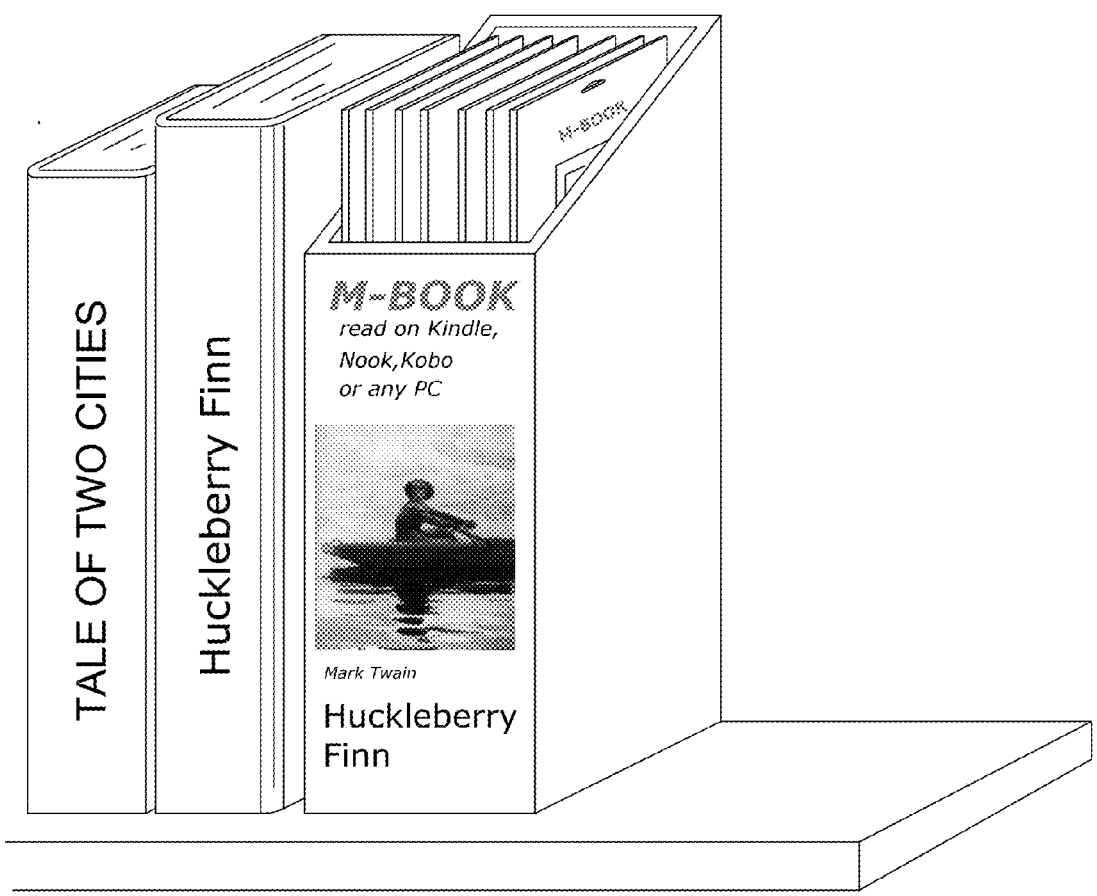

FIG. 31 shows display container 166, now filled with m-books 170. The advantage of this arrangement is that the consumer can browse the paper-and-ink book 168 next to the m-books 170, and decide whether to purchase the item in hardcopy or digital media version.

Figure 32:
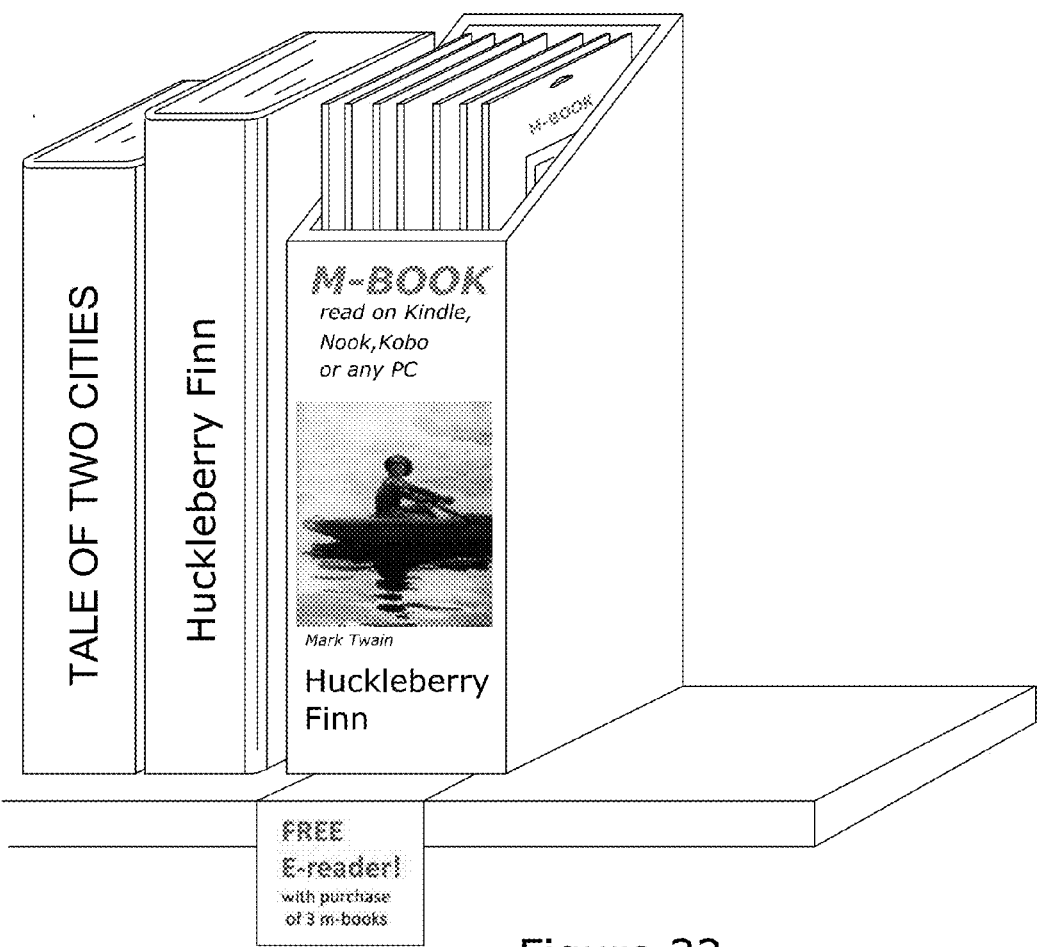

FIG. 32 shows a further retail display for m-books, further including an incentive whereby a customer can obtain a free or reduced-cost p-reader by satisfying purchase criteria. In the embodiment of FIG. 32, a free p-reader is provided with the purchase of at least three m-books.

The embodiments described above have generally been based on a device called the "m-book", which is basically an enclosure for a book stored in a solid state storage device and which can be inserted into the e-reader's USB port to transfer the content into the e-reader. An alternative embodiment of this invention consists of a similar storage device such as an SD card or a micro-SD card (or other storage media), which can be loaded into an SD-card reader included in the e-reader.

The SD card or micro-card can also be packaged and displayed in the store, and an optional carrier structure can be designed to make the handling and insertion into the device easier, because those very tiny devices are difficult to handle and can be very intimidating, especially to potential users having limited experience or skills with consumer electronics.

The system that is common to many of the embodiments described herein is a new hybrid system for books that is located between the traditional brick and mortar bookstore that sells paper and ink books, and the electronic book downloaded over the Internet. The new hybrid system takes advantage of the brick and mortar establishment that makes it possible for the consumer to conveniently browse for books, but it also takes advantage of modern electronic technology that makes it possible to avoid the high expense of manufacturing paper and ink books. This new hybrid system is a viable permanent solution that will co-exist with the other solutions. Therefore the future of the book market may consist of three segments: (1) traditional paper & ink books; (2) e-books downloaded over the Internet; and (3) m-books purchased at a retail location (bookstore, airport, supermarket, check-out area of any suitable retail store, etc.), or even purchased over the phone or over the Internet but shipped in form of an m-book.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

What is claimed:

1. An apparatus for the conveyance of digital media comprising: a housing serving as a protective enclosure to electronic components contained within it; a storage device receptacle enabling alternate engagement and disengagement of a persistent storage device containing electronic media content; a first connector adapted for connection to a digital communications receptacle in an electronic reader device and for communication of contents of the persistent storage device with said electronic reader device when said persistent storage device is engaged within said storage device receptacle; a second connector, of a different physical type from the first connector, adapted for connection to a digital communications receptacle in an electronic reader device and for communication of contents of the persistent storage device with said electronic reader device when said persistent storage device is engaged within said storage device receptacle.

2. The apparatus of claim 1, in which said persistent storage device is an SD card.

3. The apparatus of claim 1, in which said first connector is a USB connector, and said second connector is a micro USB connector.

4. The apparatus of claim 1, in which said storage device receptacle comprises a slot in an exterior surface of said housing into which said persistent storage device can be at least partially inserted.

5. The apparatus of claim 4, in which:
said persistent storage device comprises a storage device magnet positioned towards a leading edge of said storage device; said storage device receptacle enables insertion of said persistent storage device wholly within a perimeter of said housing; said apparatus further comprises a housing magnet moveably retained within said housing.

6. The apparatus of claim 5, in which said housing magnet is moveable between at least a first position proximate said storage device magnet when said storage device is inserted within said housing, and a second position further from said storage device magnet when said storage device is inserted within said housing.

7. The apparatus of claim 6, further comprising a groove within said housing along which said housing magnet can be moved between the first and second positions.

8. The apparatus of claim 5, in which said housing magnet is moveable between a first polarity in which said housing magnet attracts said storage device magnet, and a second polarity in which said housing magnet repels said storage device magnet.

9. The apparatus of claim 1, in which the housing further comprises a cover which can be removed to expose said storage device receptacle, and attached to enclose said storage device receptacle.

\* \* \* \* \*